(12) United States Patent
Boucké

(10) Patent No.: US 12,366,072 B2
(45) Date of Patent: Jul. 22, 2025

(54) DECORATIVE PANEL, DECORATIVE COVERING COMPOSED OF A PLURALITY OF SUCH PANELS, AND DECORATIVE PANEL SYSTEM

(71) Applicant: I4F Licensing NV, Turnhout (BE)

(72) Inventor: Eddy Alberic Boucké, Menen (BE)

(73) Assignee: i4F Licensing NV, Turnhout (BE)

( * ) Notice: Subject to any disclaimer, the term of this patent is extended or adjusted under 35 U.S.C. 154(b) by 195 days.

(21) Appl. No.: 17/981,232

(22) Filed: Nov. 4, 2022

(65) Prior Publication Data
US 2024/0026688 A1    Jan. 25, 2024

(30) Foreign Application Priority Data
Jul. 19, 2022   (NL) ..................................... 2032550

(51) Int. Cl.
   *G06K 19/06*     (2006.01)
   *E04F 15/024*     (2006.01)
   *G06Q 10/30*     (2023.01)

(52) U.S. Cl.
CPC ........ *E04F 15/02423* (2013.01); *G06K 19/06* (2013.01); *G06K 19/06028* (2013.01); *G06Q 10/30* (2013.01); *G06K 2019/06262* (2013.01)

(58) Field of Classification Search
CPC ......... E05F 15/02405; E04F 15/02423; G06K 19/06; G06K 19/06018; G06K 19/06028; G06K 19/06046; G06K 2019/06262; G06Q 10/30
See application file for complete search history.

(56) References Cited

U.S. PATENT DOCUMENTS

| | | | |
|---|---|---|---|
| 11,182,570 B1 * | 11/2021 | Karan ................. | B42D 25/351 |
| 2016/0193857 A1 * | 7/2016 | De Mondt ........... | B41M 5/5263 |
| | | | 52/311.1 |
| 2016/0375718 A1 * | 12/2016 | Van Garsse .......... | G06F 3/1251 |
| | | | 52/311.1 |
| 2023/0175271 A1 * | 6/2023 | Buhlmann ............ | E04F 15/107 |
| | | | 52/578 |
| 2023/0234328 A1 * | 7/2023 | Baert .................... | B29C 48/92 |
| | | | 52/588.1 |
| 2023/0306218 A1 * | 9/2023 | Kayalar ............... | G06K 7/1473 |

FOREIGN PATENT DOCUMENTS

| | | |
|---|---|---|
| EP | 3825137 A1 | 5/2021 |
| KR | 1020060091483 A | 8/2006 |
| KR | 1020190086292 A | 7/2019 |
| WO | 2019135017 A1 | 7/2019 |

* cited by examiner

*Primary Examiner* — Chi Q Nguyen
(74) *Attorney, Agent, or Firm* — The Webb Law Firm

(57) ABSTRACT

Provided is a decorative panel, in particular a decorative floor panel, ceiling panel, or wall panel. Also provided is a decorative covering that may include a plurality of decorative panels, which may be interconnected, where the covering may include entire panels and sawn panel parts and/or cut panel parts.

20 Claims, 13 Drawing Sheets

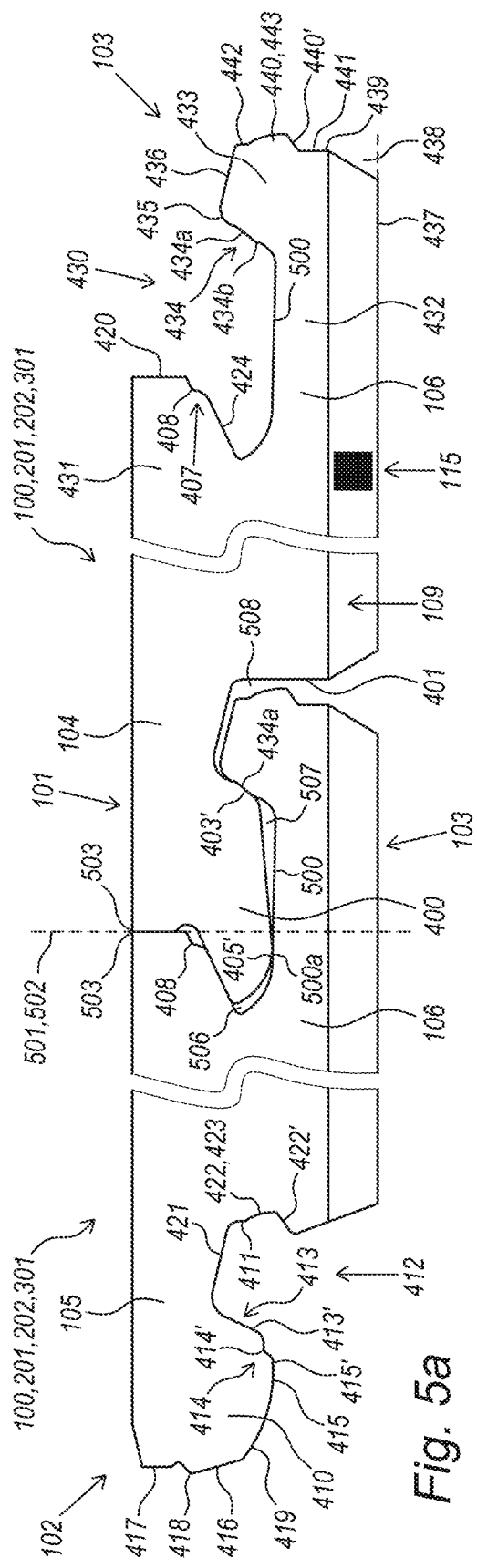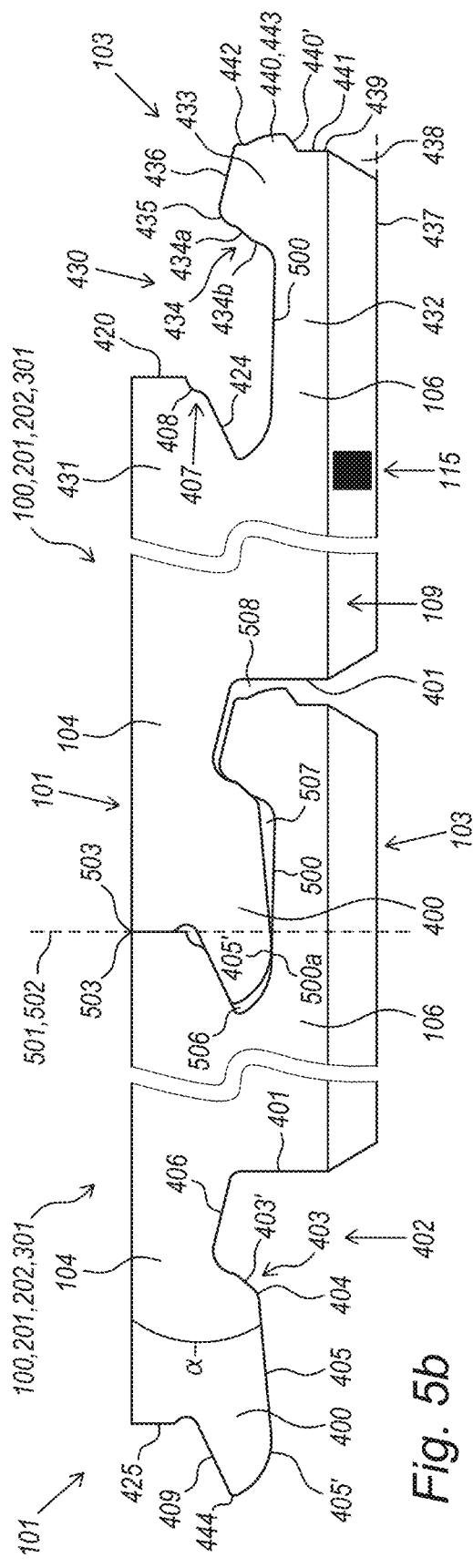

DECORATIVE PANEL, DECORATIVE COVERING COMPOSED OF A PLURALITY OF SUCH PANELS, AND DECORATIVE PANEL SYSTEM

CROSS-REFERENCE TO RELATED APPLICATION

This application claims priority to The Netherlands Patent Application No. 2032550 filed Jul. 19, 2022, the disclosure of which is hereby incorporated by reference in its entirety.

BACKGROUND OF THE INVENTION

Field of the Invention

The invention relates to a decorative panel, in particular a decorative floor panel, ceiling panel or wall panel. The invention also relates to a decorative covering composed of a plurality of, preferably interconnected, decorative panels according to the invention, wherein said covering preferably comprises entire panels and sawn panel parts and/or cut panel parts. The invention further relates to a decorative panel system, comprising at least one decorative panel, in particular a decorative panel according to the invention.

Description of Related Art

The last decades has seen enormous advance in the market for flooring for floor covering. It is known to install floor panels on a underlying floor in various ways. It is, for example, known that the floor panels are attached at the underlying floor, either by gluing or by nailing them on. This technique has a disadvantage that is rather complicated and that subsequent changes can only be made by breaking out the floor panels. According to an alternative installation method, the floor panels are installed loosely onto the subflooring, whereby the floor panels mutually match into each other by means of a tongue and groove coupling, whereby mostly they are glued together in the tongue and groove, too. The floor obtained in this manner, also called a floating floor, has as an advantage that it is easy to install and that the complete floor surface can move which often is convenient in order to receive possible expansion and shrinkage phenomena. Whereas flooring used to be made of wood or wood-derived products, lately the market has evolved towards plastic based panels, like PVC panels and even towards mineral-based panels, like magnesium-oxide based panels. A shared inevitable drawback is that the consumer, installer, and/or de-installer often lacks knowledge about how to properly install the panels and/or about the further material characteristics.

SUMMARY OF THE INVENTION

It is a first object of the invention to provide more panel related information to a user.

It is a second object of the invention to provide panel related information to a user in a more efficient manner.

It is a third object of the invention to provide panel related information to a user in a more durable manner.

One or more of these objects can be achieved by providing a decorative panel according to the preamble, comprising:
  a. a core having a lower side and an upper side,
  b. a decorative top structure affixed, either directly or indirectly, to the upper side of the core, and
  c. at least one readable information carrying element carrying and/or provided with information relating to at least one panel related characteristic, wherein at least one information carrying element is preferably printed onto a rear side of the panel.

By providing a panel with one more information carrying elements, the panel as such provides panel related to a user, such as an installer and/or consumer. Hence, the user is no longer dependent on information presented in an original packaging of the panels, which will typically be thrown away after installation of the panels. The panel related information remains part of the panel as a result of which the user can consult the panel related information by using the panel as such, e.g. during installation of the panel, during use of the panel, during de-installation of the panel, during throwing away the panel after user. The number of information carrying elements, the location of the one or more information carrying elements, the type of information carrying elements, the application method of applying the information carrying elements, and the nature of the information carried, directly or indirectly, by the one or more carrying elements may vary, and may vary per information carrying element and/or per panel. Further embodiments of the panel have been described below.

In a preferred embodiment, the panel is a rectangular panel, preferably an oblong rectangular panel, having two intersecting main principal axes which divide the panel into four quadrants, and wherein the panel comprises a plurality of said information carrying elements, wherein at least two information carrying elements are located in different quadrants. More preferably, the panel comprises at least four of said information carrying elements, wherein each quadrant is provided with at least one information carrying element. Preferably, each quadrant can be divided in four sub quadrants by two auxiliary principal axes, wherein one corner sub quadrant of each quadrant is situated at a distance from the main principal axes, wherein each corner quadrant is provided with at least one information carrying element. Spreading the plurality information carrying elements over said panel has as significant advantage that after cutting or sawing the panels into one or more panel segments, typically in longitudinal and/or transverse direction, during installation, in particular to make the panel fit within a specific space, each panel segment typically remains provided with an information carrying element. Instead of rectangular panels also other polygonal shape, in particular simple polygonal shapes, such as triangular shapes, hexagonal shapes, octagonal shapes, etcetera, could be used as decorative panel according to the invention. Also these alternatively shaped panels could be provided with a plurality of information carrying element, which are preferably spread over different (virtual) segments of the panel, preferably defined by at least two main principal axes, wherein said segments are more preferably located at opposing sides of one of said main principal axes.

In a preferred embodiment, at least one information carrying element is at least partially printed by using white ink and/or whitish ink. White and/or whitish ink commonly provides a good contract between the information carrying element(s) and the surrounding part of the panel. Preferably, at least one information carrying element(s) is printed on a rear side of the panel. The rear side of the panel may be formed by the core of the panel and/or by a backing layer of the panel. The core and the backing layer typically have a darker colour (in particular grey, brown, or white). On these darker backgrounds, it is advantageous to apply an information carrying element at least partially having a lighter colour, such as a white or whitish colour, which improves the readability of the information carrying element.

Preferably, at least one information carrying element comprises a plurality of printed layers, wherein at least two printed layers are preferably on top of each other. It is conceivable that at least two printed layers are at least partially positioned side-by-side and therefore a arranged in the same plane. Preferably, at least one information carrying element comprises a fixed first print layer, and a variable second print layer which preferably at least partially overlaps with the first print layer. The fixed print layer may e.g. be formed by a contrast layer, such as a white or whitish layer. Preferably, the first print layer is visually discernible from the second print layer. To this end, it is preferable that the variable print layer has a different colour compared to the fixed print layer. The variable print layer preferably comprises and/or shows panel related information, such as a panel identification number (e.g. a serial number), and/or a production date and/or a (matrix) barcode and/or one or more alternative characteristics. It is imaginable that the first print layer is formed from one type of printing, for example lithographic, silk screen or gravure printing, while the second print layer is formed from a second type of printing, for example ink-jet, laser, ribbon or re-transfer printing. Hence, it is, for example, imaginable that the first print layer is a lithographic print layer and the second print layer is an ink jet print layer.

As already indicated above, it is imaginable that at least one information carrying element is printed, either directly or indirectly, to the core and/or onto a backing layer affixed to the lower side of the core. Instead of, or in addition to, printing, it is imaginable that at least one information carrying element is at least partially embedded, preferably entirely embedded, into the core and/or pressed and/or engraved into the core. In case of an embedded information carrying element, the information carrying element can be entirely incorporated within the panel and/or can be entirely be surrounded by panel material, preferably core material. It is additionally or alternatively imaginable that the panel comprises at least one backing layer, either directly or indirectly, affixed to the lower side of the core, and wherein at least one information carrying element is at least partially embedded into and/or affixed to said backing layer. In this embodiment, it is e.g. imaginable that the information carrying element is sticked and/or glued onto the backing layer. As an alternative to the embodiments described in this paragraph, it is imaginable that the backing layer is omitted wherein the one or more information carrying elements are applied, according to one or more of the aforementioned application techniques, onto or into the core and/or another panel layer.

Preferably, at least one information carrying element is a human-readable information carrying element. This means that said at least one information carrying element is visible and interpretable (readable) by a user. Here, the expression "readable" may also include the expression "feelable" or otherwise perceptible by a user. At least one information carrying element comprises visible information, such textual information and/or graphical information, such as installation instructions. These installation instructions may textually describe and/or display in pictures how a covering composed of a plurality of panels according to the invention can be installed. It is alternatively or additionally imaginable that at least one information carrying element comprises haptic information, such embossed and/or debossed information.

In a preferred embodiment, at least one information carrying element is a machine-readable information carrying element configured to be read by a machine such as a camera, a scanner, and/or digital reader. Such an information carrying element may be visible for user or hidden from a user, provided that a dedicated machine reader is able to read information from the information carrying element. Here it is for example imaginable that at least one information carrying element comprises a representation of a digital link, such as a weblink and/or hyperlink, directing to at least one digital location, preferably a webpage, where information relating to at least one panel related characteristic, and preferably a digital panel passport, is stored and/or retrievable. The information relating to at least one panel related characteristic stored at said digital location and/or retrievable via said digital location may comprise static information, such as text or an image; and/or comprises dynamic information, such as a video or auditory information. Using a digital location has the great advantage that an infinite amount of panel related information can be presented to the user.

Preferably, at least one information carrying element represents a machine-readable code, such as a linear bar code and/or a matrix barcode, such as a QR code. Alternatively or additionally, at least one information carrying element represents a machine-readable passive tag, such as an RFID tag or an NFC tag. Such a tag may be entirely embedded within the core (and/or one or more other panel layers) and may as such be entirely hidden the outside.

At least one, and preferably each, information carrying element is configured to provide, directly and/or indirectly, information relating to at least one panel related characteristic chosen from the group consisting of: the installation of the panel to compose a panel covering, such as a floor covering; the dimensioning of the panel; the material composition of at least one panel layer; the origin of at least one material used in at least one panel layer; recycling related information of the panel; the authenticity of the panel; the circularity of the panel, the type of coupling profiles used at least two panel edges; embodied carbon; total of volatile compounds; pigments used; the certifications and declarations relating to the panel; and/or other documentation relating to the panel. Preferably, a combination of two or more of said characteristics are accessible, either directly or indirectly, to the user. In this manner, a digital panel passport can be given access to a user, in particular to give the user a look at the panel content and/or panel attributes. Recycling related information may, for example, include information whether recycling of the panel layer, and optionally of the panel as such, is possible and feasible, and if so, which type of chemical and/or mechanical recycling method(s) is(/are) preferably used in this respect. In a practical embodiment, at least one (visible) information carrying element is formed by a QR code which is scannable (readable) by a machine, which may be a smartphone or tablet, and which leads to user to a webpage where a digital panel passport is shown. The webpage may be a restricted webpage, which allows conditional access wherein the digital key to said webpage may be formed by the QR code itself, or may be an unrestricted, public webpage. The information carrying element of a panel may carry unique information for that specific panel and/or for the assembly of packed panels and/or for a(nother) batch or series of panels.

As indicated above, the panel may be provided, and is preferably provided with at least two information carrying elements, wherein at least one information carrying element is preferably printed and/or stamped and/or hot pressed. This typically leads to a permanent fixation of said at least one information carrying element is permanently fixed to at least one panel layer.

Preferably, the panel comprises a first panel edge comprising a first coupling profile, and a second panel edge comprising a second coupling profile being designed to engage interlockingly with said first coupling profile of an adjacent panel, preferably both in horizontal direction and in vertical direction.

Preferably, the first coupling profile and the second coupling profile are configured such that two of such panels can be coupled to each other by means of a turning movement and/or by means of a vertical movement.

Preferably, in coupled state of adjacent panels, the first coupling profile of the panel and the second coupling profile of an adjacent panel are configured such that two of such panels can be uncoupled to each other by means of a turning movement and/or by means of a vertical movement and/or by means of a horizontal movement.

It is often preferred that the panel comprises at least one third coupling profile and at least one fourth coupling profile located respectively at a third panel edge and a fourth panel edge. Preferably, the third coupling profile and the fourth coupling profile are configured such that two of such panels can be coupled to each other by means of a turning movement.

In a preferred embodiment, the first coupling profile and/or the third coupling profile comprises: an upward tongue, at least one upward flank lying at a distance from the upward tongue, an upward groove formed in between the upward tongue and the upward flank wherein the upward groove is adapted to receive at least a part of a downward tongue of a second coupling profile of an adjacent panel, and at least one first locking element, preferably provided at a distant side of the upward tongue facing away from the upward flank, and wherein the second coupling profile and/or the fourth coupling profile comprises: a first downward tongue, at least one first downward flank lying at a distance from the downward tongue, a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces.

In the abovementioned embodiment, it is imaginable that the first coupling profile (and/or third coupling profile) and the second coupling profile (and/or fourth coupling profile) are configured such that in coupled condition a pretension is existing, which forces coupled panels at the respective edges towards each other, wherein this preferably is performed by applying overlapping contours of the first coupling profile (and/or third coupling profile) and the second coupling profile (and/or fourth coupling profile), in particular overlapping contours of downward tongue and the upward groove and/or overlapping contours of the upward tongue and the downward groove, and wherein the first coupling profile (and/or third coupling profile) and the second coupling profile (and/or fourth coupling profile) are configured such that the two of such panels can be coupled to each other by means of a fold-down movement and/or a vertical movement, such that, in coupled condition, wherein, in coupled condition, at least a part of the downward tongue of the second coupling profile (and/or fourth coupling profile) is inserted in the upward groove of the first coupling profile (and/or third coupling profile), such that the downward tongue is clamped by the first coupling profile (and/or third coupling profile) and/or the upward tongue is clamped by the second coupling profile (and/or fourth coupling profile).

It is imaginable that the first coupling profile is configured to co-act with the second coupling profile as well as with the fourth coupling profile, and that the third coupling profile is also configured to co-act with the second coupling profile as well as with the fourth coupling profile. It is imaginable that the first coupling profile and the fourth coupling profile are identical.

In an embodiment of the panel according to the invention, the first coupling profile and/or the third coupling profile comprises: a sideward tongue extending in a direction substantially parallel to the upper side of the core, at least one second downward flank lying at a distance from the sideward tongue, and a second downward groove formed between the sideward tongue and the second downward flank, and wherein the second coupling profile and/or the fourth coupling profile comprises: a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

It is conceivable that each first coupling profile and each third coupling profile is compatible—hence may co-act and interlock—with each second coupling profile and each fourth coupling profile. This may also apply in case interlocking coupling profiles do not have a completely complementary shape.

In a preferred embodiment, at least coupling profile, and preferably all coupling profiles, is/are at least partially formed by the core.

As indicated above, the core is preferably at least partially made of at least one polymer, in particular a thermoplastic material and/or a thermoset material, wherein, preferably, the core comprises a composite comprising at least one polymer, in particular a thermoplastic material and/or a thermoset material, and at least one non-polymeric material. Said non-polymeric material preferably at least one material selected from the group consisting of: steel, glass, polypropylene, wood, acrylic, alumina, curaua, carbon, cellulose, coconut, kevlar, nylon, perlon, rock wool, sisal, fique, a mineral filler, in particular chalk. This may further increase the strength of the panel and/or the water resistivity and/or the fireproof properties of the panel as such, and/or may lower the cost price of the panel as such. Preferably, the base material of the core, or at least one core layer, comprises a (main) polymer, preferably a thermoplastic material, which is more preferably chosen from the group consisting of:

PVC, PET, PP, PS, thermoplastic polyurethane (TPU), PE, in particular MDPE and/or HDPE; and combinations thereof. PS may be in the form of expanded PS (EPS) in order to further reduce the density of the floor covering element, which leads to a saving of costs and facilitates handling of the panels. Also in case another thermoplastic material is used, this material may be applied in foamed state in the core to reduce the density and costs. Nevertheless, it is also imaginable that the thermoplastic material used as main polymer is a solid polymer (i.e. an unfoamed polymer). Preferably, at least a fraction of the polymer used may be formed by recycled thermoplastic, such a recycled PVC or recycled PU. It is conceivable that a mix of virgin and recycled thermoplastic material is used to compose at least a part of the core. Instead of the thermoplastic material, also a thermoset polymer may be used, such as thermoset polyurethane.

At least a part of the core may be made of a composite of at least one polymer and at least one non-polymeric material. The composite of the core layer preferably comprises one or more fillers, wherein at least one filler is preferably selected from the group consisting of: talc, chalk, wood, calcium carbonate, titanium dioxide, calcined clay, porcelain, glass, carbon particles, silicon particular, a(nother) mineral filler, rice, a(nother) natural filler, a(nother) (auxiliary) polymer, such as an elastomer and/or latex. It is also imaginable that rubber and/or elastomeric parts (particles) are dispersed within the composite to improve the flexibility and/or impact resistance at least to some extent. The core may (thus) be rigid, semi-flexible, or flexible, and so can be the floor covering element as such. The filler may be formed by fibres, such as glass fibers or synthetic or genuine leather fibers, and/or may be formed by dust-like particles. Here, the expression "dust" is understood as small dust-like particles (powder), like bamboo dust, wood dust, cork dust, or non-wood dust, like mineral dust, stone powder, in particular cement, and combinations thereof. The average particle size of the dust is preferably between 14 and 20 micron, more preferably between 16 and 18 micron. The primary role of this kind of filler is to provide the core, and the panel as such, sufficient hardness and/or to decrease the cost price of the core, and hence of the panel. Moreover, this kind of filler will typically also improve the impact strength of the core and of the panel as such. Preferably, the filler content in the composite material of the core is between 30 and 75% by weight of the composite material of the core, more preferably between 50 and 60% by weight of the composite material of the core. Preferably, the polymer content in the composite material of the core is between 25 and 70% by weight of the composite material of the core, more preferably between 40 and 50% by weight of the composite material of the core. The polymer can either be foamed or unfoamed. Preferably, the composite of the core comprises at least one filler selected from the group consisting of: a salt, a stearate salt, calcium stearate, and zinc stearate. Stearates have the function of a stabilizer, and lead to a more beneficial processing temperature, and counteract decomposition of components of the composite during processing and after processing, which therefore provide long-term stability. Instead of or in addition to a stearate, for example calcium zinc may also be used as stabilizer. The weight content of the stabilizer(s) in the composite will preferably be between 1 and 5%, and more preferably between 1.5 and 4%. The composite of the core preferably comprises at least one impact modifier comprising at least one alkyl methacrylate, wherein said alkyl methacrylate is preferably chosen from the group consisting of: methyl methacrylate, ethyl methacrylate, propyl methacrylate, isopropyl methacrylate, t-butyl methacrylate and isobutyl methacrylate. The impact modifier typically improves the product performance, in particular the impact resistance. Moreover, the impact modifier typically toughens the core layer and can therefore also be seen as toughening agent, which further reduces the risk of breakage. Often, the modifier also facilitates the production process, for example, as already addressed above, in order to control the formation of the foam with a relatively consistent (constant) foam structure. The weight content of the impact modifier in the composite will preferably be between 1 and 9%, and more preferably between 3 and 6%. At least one plastic material used in the core layer is preferably free of any (toxic) plasticizer in order to increase the desired rigidity of the core layer, which is, moreover, also favourable from an environmental point of view. The core and/or another layer of the panel may comprise wood-based material, for example, MDF, HDF, wood dust, bamboo, prefabricated wood, more particularly so-called engineered wood. This wood-based material may be part of a composite material of the core.

It is imaginable that the core, and/or at least one core layer (and/or another layer), comprises a composite of at least one polymer and rice. Preferably, the rice is formed by rice hulls, more preferably a mixture of separated rice hulls and/or ground rice hulls and/or rice hull powder. Preferably, the different rice hull types have different average particle sizes. The polymer(s) act(s) as polymeric binder, wherein preferably an at least partially recycled plastic polymer, such as TPU, PP, PE, PET, and/or PVC, is used. The unground rice hull can for example be present in an amount of 1-98% by weight relative to the weight rice hull mixture. Likewise, the ground rice hull and powdered rice hull can also be present in an amount of 1-98% by weight relative to the weight of the rice hull mixture. Preferably, in one embodiment the rice hull mixture comprises 20-50% by weight of each of the unground rice hull, the ground rice hull and the rice hull powder. In a particularly preferred embodiment, the rice hull mixture comprises about 33% by weight of each of the unground rice hull, the ground rice hull and the rice hull powder. The amount of the polymeric binder present in the rice hull mixture can vary and may e.g. be 1-30%, preferably 10-25%, more preferably 12-20% by weight of the rice hull mixture. The rice hull powder preferably has an average particle size of 0.175-1.20 millimetre.

It is imaginable that at least one core layer (and/or at least one other layer) comprises rice hulls, rice straw, and vegetable adhesive. Preferably, the vegetable adhesive comprises natural grass and/or wood dust. Preferably the natural grass comprises any one or more selected from the group consisting of rice grass, glutinous rice grass, and starch grass. Preferably, rice straw and/or rice hulls is/are used in an amount of 20-50%, preferably 40-50%, more preferably 35-45%, by weight based upon the weight of the (core) layer in which the rice straw and/or rice hulls is/are incorporated, in particular embedded. When more than 50% by weight of rice straw is included, there may be a problem that the moisture resistance drops significantly, while applying less than 20% by weight of rice straw the binding force may drop. Preferably, the vegetable adhesive is used in an amount of 1-20% by weight of the (core) layer.

The rice hull may be added as a main component of a thermal insulation material to provide porosity, thereby providing thermal and acoustic insulation effects. The rice straw may be added to provide binding to the insulation, with stem and leaf portions that leave the rice threshed.

Preferably, the straw is cut to an appropriate length and preferably 3 centimetre or less.

The vegetable adhesive (vegetable binder), which may be used at least one core layer (and/or at least one other layer), preferably uses trees such as natural grass, pine bark, rubber trees, and the like prepared by mixing rice flour such as rice grass, glutinous rice grass, starch grass, and gluten with water. Preferably, the use of a mixture of natural grass and trees is preferred in terms of improving moisture resistance. When natural grass and tree-like liquid are mixed and used, the mixture is preferably used at a ratio of 2.5:7.5 to 6.5:3.5.

In a preferred embodiment of the invention, at least one core layer and/or at least one other layer comprises a mixture of clay, in particular kaolin clay, and rice, in particular rice hull. The clay serves to increase the flash point of rice, in particular the rice hulls, which is advantageous from a fire safety point of view, and moreover serves to further increase the strength of the core layer (and/or other layer) in which the clay and rice are incorporated, in particular embedded.

Alternatively, the core is at least partially composed of another base material, such as a mineral material, like magnesium oxide, magnesium hydroxide, gypsum, (lightweight) concrete, and/or clay; and/or a wood or a wood-based material, such as HDF or MDF, or any other thermoplastic-free material, may be used as base material.

The density of the core typically varies from about 0.1 to 1.5 grams/cm3, preferably from about 0.2 to 1.4 grams/cm3, more preferably from about 0.3 to 1.3 grams/cm3, even more preferably from about 0.4 to 1.2 grams/cm3, even more preferably from about 0.5 to 1.2 grams/cm3, and most preferably from about 0.6 to 1.2 grams/cm3. It is imaginable that each panel comprises a plurality of core (sub)layers. Different core (sub)layers may have either identical compositions or different compositions, and/or different densities.

The decorative top structure preferably comprises at least one decorative layer and at least one transparent wear layer covering said decorative layer. The decorative top structure may additionally comprise at least one back layer situated in between said decorative layer and the core, wherein said back layer is preferably at least partially made of a vinyl compound, wood, paper, textile, such as, and/or combinations thereof. The one or more materials used in said at least one back layer may virgin materials, recycled materials, and combinations thereof. Here, it is for example imaginable and even preferred that the back layer comprises a mixture of wood, cotton; and at least one binding agent. Preferably, the back layer comprises wood in an amount of 20-60% by weight of the back layer, and a cotton based material, such as recycled jeans and/or raw cotton (virgin cotton), in an amount of 30-70% by weight of the back layer, and at least one binding agent, preferably in an amount of 1-7% by weight of the back layer. The back layer may be free of PVC and/or any other synthetic polymer. Optionally, the back layer may act as decorative layer (which does not require a separate decorative layer on top).

A lacquer layer or other protective layer may be applied on top of said wear layer. The protective layer and/or wear layer preferably comprises silicon oxide (SiO2). A finishing layer may be applied in between the decorative layer and the wear layer. The decorative layer will be visible and will be used to provide the panel an attractive appearance. To this end, the decorative layer may have a design pattern, which can, for example be a wood grain design, a mineral grain design that resembles marble, granite or any other natural stone grain, or a colour pattern, colour blend or single colour to name just a few design possibilities. It is imaginable and may even be preferred that the decorative layer comprises at least one recycled material and/or at least one natural material, such as e.g. wood, textile, and/or mixtures. The decorative layer may be free of PVC and/or any other synthetic polymer. Customized appearances, often realized by digital printing during the panel production process, are also imaginable. The decorative top structure may also be formed by a single layer. In an alternative embodiment, the decorative top structure is omitted, thus not applied, in the panel according to the invention. In this latter embodiment, the upper side of the core constitutes the upper side of the panel.

The decorative layer may be formed at least partially by a (digitally) printed plastic layer, in particular a thermoplastic layer, or a (digitally) printed film, in particular paper film or thermoplastic film. The plastic material, in particular the thermoplastic material, is used can be of various nature, but commonly PVC or PU, in particular TPU, is preferred as material. Preferably this (thermo)plastic layer or paper film is preferably a white plastic layer or white film, preferably an opaque white layer or opaque white film. White, and in particular opaque white, will provide a bright background which will reflect back to the viewer the light that travels through transparent ink colours.

The decorative layer may also be formed by an ink layer printed, preferably digitally printed, either directly or indirectly onto the core. The decorative layer may at least partially made of at least one biobased material, such as a polymer, in particular TPU, based upon plant-based oils such as canola oil or castor oil. The decorative may additionally comprise mineral components such as chalk. This combines sustainability with extremely high levels of resilience for an improved panel performance in terms of acoustic properties, indentation resistance, etcetera.

The decorative top structure may also comprise and/or constitute a carpet base having pile yarns projecting upwardly therefrom. The pile yarns can be made from a number of natural or synthetic fibres. Many types of yarn are made differently though, wherein there are typically two main types of yarn: spun and filament. The yarns may be made of nylon but other suitable synthetic yarns such as polyester, polypropylene, acrylic or blends thereof can be employed. The carpet tile may be either rigid or flexible. It is also conceivable that the base is free of any yarn or fibres. The pile yarns may consist of loop piles. It is however also possible that the pile yarns consist of cut piles, twisted piles or any other suitable pile yarns in for example a level- or multilevel configuration. The loop piles are possibly synthetic yarns, such as nylon, polyester, polypropylene, acrylic or blends thereof. In the shown embodiment, the loop piles are tufted in the carpet base. The carpet base preferably also comprises a backing sheet, which can for example be a non-woven sheet, a woven sheet, a non-woven polyester sheet, a polypropylene sheet, a glass fibre scrim or tissue sheet or combinations thereof. The backing sheet typically acts as support structure (holding structure) for holding the yarns. To more efficiently bond the tufts in position on the carpet base, and in particular on the backing sheet, preferably a pre-coat layer is applied. This pre-coat layer can for example be a latex layer.

The panel thickness is typically situated in between 3 and 12 mm, preferably between 4 and 8 mm.

The invention also relates to a decorative covering composed of a plurality of, preferably interconnected, decorative panels according to the invention. In a preferred embodiment, said covering comprises sawn panel parts and/or cut panel parts, wherein each panel part is provided with at least one information carrying element, preferably at least one information carrying element is printed onto a rear side of the panel part.

The invention further relates to a decorative panel system, comprising:
- at least one decorative panel, in particular a decorative panel according to the invention, wherein said panel comprises: a core having a lower side and an upper side, a decorative top structure affixed, either directly or indirectly, to the upper side of the core, and at least one machine-readable information carrying element carrying and/or provided with information relating to at least one panel related characteristic, wherein said machine-readable information carrying element comprises a representation, such as a barcode, in particular a QR code, of a digital link, such as a weblink and/or hyperlink, directing to at least one digital location where information relating to at least one panel related characteristic, and preferably a digital panel passport, is stored and/or retrievable,
- at least one digital scanner, such as a smartphone or tablet, for reading, in particular scanning, said digital link and for referring the user to said digital location for displaying information relating to at least one panel related characteristic, and preferably a digital panel passport,
- at least one server, in particular a webserver, having at least one digital location where said information is stored and retrievable.

Preferably, said digital scanner is configured to communicate wirelessly with said server, wherein more preferably use is made of the Internet. Typically, displaying of the panel related information occurs via a user screen, which preferably makes integral part of said digital scanner, such as a camera, in particular of a smartphone or a tablet, of said user. It is imaginable that the panel related information is displayed directly on the screen when scanning said information carrying element, which may be an augmented reality (AR) view, wherein the user sees an image of the panel actually scanned on the user's screen, which image is augmented (or supplemented) by computer-generated panel related information, which e.g. be in the form of sound, video, graphics, text, symbols, or location, for example, global positioning system (GPS), data, and/or location based data, such as the local temperature and/or humidity and/or time. Nowadays smartphones or tablets have advanced computing capability and connectivity possibilities, which typically have sufficient computing power to allow applications like sophisticated AR applications to be run and/or to communicate with AR based webpages. The one or more AR layers displayed on the user's screen may present information in 2D and/or 3D. At least one information carrying element may also by formed by and/or represents a triggering element, which may, for example, be a specific image, a sign, and/or a code, which (triggers and) activates the visualization of information and/or aforementioned augmented reality on an external screen, such as the user's screen, typically over a live image of at least a part of the decorative panel (as scanned at that moment). Such a triggering element is also referred to as an AR triggering element.

Further embodiments of the invention are set out in the non-limitative set of clauses presented below:

Clauses

1. A decorative panel, in particular a decorative floor panel, ceiling panel or wall panel, comprising:
   a. a core having a lower side and an upper side,
   b. a decorative top structure affixed, either directly or indirectly, to the upper side of the core, and
   c. at least one readable information carrying element carrying and/or provided with information relating to at least one panel related characteristic, wherein at least one information carrying element is printed onto a rear side of the panel.

2. Panel according to clause 1, wherein the panel is a rectangular panel, preferably an oblong rectangular panel, having two intersecting main principal axes which divide the panel into four quadrants, and wherein the panel comprises a plurality of said information carrying elements, wherein at least two information carrying elements are located in different quadrants.

3. Panel according to clause 2, wherein the panel comprises at least four of said information carrying elements, wherein each quadrant is provided with at least one information carrying element.

4. Panel according to clause 2 or 3, wherein each quadrant can be divided in four sub quadrants by two auxiliary principal axes, wherein one corner sub quadrant of each quadrant is situated at a distance from the main principal axes, wherein each corner quadrant is provided with at least one information carrying element.

5. Panel according to any of the preceding clauses, wherein at least one information carrying element is at least partially printed by using white ink and/or whitish ink.

6. Panel according to any of the preceding clauses, wherein at least one information carrying element comprises a plurality of printed layers.

7. Panel according to clause 6, wherein at least one information carrying element comprises a fixed first print layer, and a variable second print layer which preferably at least partially overlaps with the first print layer.

8. Panel according to clause 7, wherein the first print layer is visually discernible from the second print layer.

9. Panel according to clause 7 or 8, wherein the first print layer is a lithographic print layer and the second print layer is an ink jet print layer.

10. Panel according to any of the preceding clauses, wherein at least one information carrying element is printed, either directly or indirectly, to the core and/or onto a backing layer affixed to the lower side of the core.

11. Panel according to any of the preceding clauses, wherein at least one information carrying element is at least partially embedded, preferably entirely embedded, into the core and/or pressed and/or engraved into the core.

12. Panel according to any of the preceding clauses, wherein the panel comprises at least one backing layer, either directly or indirectly, affixed to the lower side of the core, and wherein at least one information carrying element is at least partially embedded into and/or affixed to said backing layer.

13. Panel according to any of the preceding clauses, wherein at least one information carrying element is a human-readable information carrying element.

14. Panel according to any of the preceding clauses, wherein at least one information carrying element comprises visible information, such textual information and/or graphical information, such as installation instructions.

15. Panel according to any of the preceding clauses, wherein at least one information carrying element comprises haptic information, such embossed and/or debossed information.

16. Panel according to any of the preceding clauses, wherein at least one information carrying element is a machine-readable information carrying element configured to be read by a machine such as a camera, a scanner, and/or digital reader.

17. Panel according to any of the preceding clauses, wherein at least one information carrying element comprises a representation of a digital link, such as a weblink and/or hyperlink, directing to at least one digital location where information relating to at least one panel related characteristic, and preferably a digital panel passport, is stored and/or retrievable.

18. Panel according to clause 17, wherein the information relating to at least one panel related characteristic stored at said digital location and/or retrievable via said digital location comprises static information, such as text or an image; and/or comprises dynamic information, such as a video or auditory information.

19. Panel according to any of the preceding clauses, wherein at least one information carrying element represents a machine-readable code, such as a linear bar code and/or a matrix barcode, such as a QR code.

20. Panel according to any of the preceding clauses, wherein at least one information carrying element represents a machine-readable passive tag, such as an RFID tag or an NFC tag.

21. Panel according to any of the preceding clauses, wherein the panel comprises at least two printed information carrying elements.

22. Panel according to any of the preceding clauses, wherein at least one information carrying element is a stamped and/or hot pressed information carrying element.

23. Panel according to any of the preceding clauses, wherein the panel comprises a first panel edge comprising a first coupling profile, and a second panel edge comprising a second coupling profile being designed to engage interlockingly with said first coupling profile of an adjacent panel, preferably both in horizontal direction and in vertical direction, 24. Panel according to clause 23 wherein the first coupling profile comprises:
   a first upward tongue,
   at least one first upward flank lying at a distance from the upward tongue,
   a first upward groove formed in between the first upward tongue and the first upward flank wherein the first upward groove is adapted to receive at least a part of a second downward tongue of a second coupling profile of an adjacent panel, and
   preferably at least one first locking element, more preferably provided at a distant side of the first upward tongue facing away from the upward flank,
and wherein the second coupling profile comprises:
   a second downward tongue,
   at least one second downward flank lying at a distance from the downward tongue,
   a second downward groove formed in between the downward tongue and the downward flank, wherein the downward groove is adapted to receive at least a part of an upward tongue of a first coupling profile of an adjacent panel, and
   preferably at least one second locking element adapted for co-action with a first locking element of an adjacent panel, said second locking element more preferably being provided at the downward flank.

25. Panel according to clause 23 or 24, wherein the first coupling profile and the second coupling profile are configured such that two of such panels can be coupled to each other by means of a turning movement and/or by means of a vertical movement; and/or wherein, in coupled state of adjacent panels, the first coupling profile of the panel and the second coupling profile of an adjacent panel are configured such that two of such panels can be uncoupled to each other by means of a turning movement and/or by means of a vertical movement and/or by means of a horizontal movement.

26. Panel according to any of the previous clauses, wherein the panel comprises at least one third coupling profile and at least one fourth coupling profile located respectively at a third panel edge and a fourth panel edge, wherein the third coupling profile comprises:
   a sideward tongue extending in a direction substantially parallel to a plane defined by the panel and/or to the upper side of the core,
   at least one third downward flank lying at a distance from the sideward tongue, and
   a third downward groove formed between the sideward tongue and the third downward flank, wherein the third coupling profile and the fourth coupling profile are configured such that two of such panels can be coupled to each other by means of a turning movement.

27. Panel according to clause 26, wherein the fourth coupling profile comprises a fourth groove configured for accommodating at least a part of the sideward tongue of the third coupling profile of an adjacent panel, said fourth groove being defined by an upper lip and a lower lip, wherein said lower lip is provided with an upward locking element, wherein, in coupled condition: at least a part of the sideward tongue of a first panel is inserted into the fourth groove of an adjacent, second panel, and wherein at least a part of the upward locking element of said second panel is inserted into the third downward groove of said first panel.

28. Panel according to clause 27, wherein a fourth locking is provided at a distant side of the upward locking element facing away from the fourth groove, wherein said fourth locking element is configured to co-act with a locking element of a complementary coupling profile, in particular a second locking element of a second coupling profile of another panel, in coupled condition of said panels.

29. Panel according to one of clauses 23-25 and one of clauses 26-28, wherein the first coupling profile and the fourth coupling profile are identical.

30. Panel according to any of the preceding clauses, wherein the information carrying element is configured to provide information relating to at least one panel related characteristic chosen from the group consisting of: the installation of the panel to compose a panel covering, such as a floor covering; the dimensioning of the panel; the material composition of at least one panel layer; the origin of at least one material used in at least one panel layer; recycling related information of the panel; the authenticity of the panel; the circularity of the panel, the type of coupling profiles used at at least two panel edges; the certifications and declarations relating to the panel; and/or other documentation relating to the panel.

31. Panel according to any of the preceding clauses, wherein the panel comprises a plurality of information carrying elements.

32. Panel according to any of the preceding clauses, wherein at least one information carrying element is permanently fixed to at least one panel layer.

33. Decorative covering composed of a plurality of, preferably interconnected, decorative panels according to any of the preceding clauses.

34. Decorative covering according to clause 33, wherein the covering comprises sawn panel parts and/or cut panel parts, wherein each panel part is provided with at least one information carrying element, preferably at least one information carrying element is printed onto a rear side of the panel part.

35. Decorative panel system, comprising:
at least one decorative panel, in particular a decorative panel according to one of clauses 1-32, wherein said panel comprises: a core having a lower side and an upper side, a decorative top structure affixed, either directly or indirectly, to the upper side of the core, and at least one machine-readable information carrying element carrying and/or provided with information relating to at least one panel related characteristic, wherein said machine-readable information carrying element comprises a representation, such as a barcode, in particular a QR code, of a digital link, such as a weblink and/or hyperlink, directing to at least one digital location where information relating to at least one panel related characteristic, and preferably a digital panel passport, is stored and/or retrievable,
at least one digital scanner, such as a smartphone or tablet, for reading, in particular scanning, said digital link and for referring the user to said digital location for displaying information relating to at least one panel related characteristic, and preferably a digital panel passport, on a screen, in particular a user screen,
at least one digital location where said information is stored and retrievable, wherein, preferably said digital scanner is configured to communicate wirelessly with said server, more preferably by making use of the Internet.

36. System according to clause 35, wherein the digital scanner and the screen are integrated in a single device, in particular a user device, such as a smartphone or tablet.

37. System according to clause 35 or 36, wherein at least one digital location makes part of a server, such as a webserver, and/or wherein at least one digital location makes part of the device, in particular of an application installed on said device.

38. System according to any of clauses 35-37, wherein at least a part of at least one information carrying element represents an augmented reality triggering element for displaying said information as augmented reality layer over a live image of at least a part of said decorative panel.

BRIEF DESCRIPTION OF THE DRAWINGS

The invention will be elucidated on the basis of non-limitative exemplary embodiments shown in the following figures, wherein.

FIG. 4a shows a cross-sectional view along line A-A of a decorative panel as shown in FIG. 1a, 2a, or 3a;

FIG. 4b shows a cross-section along line B-B of a decorative panel as shown in FIG. 1a, 2a or 3a;

FIGS. 5a-5c show a cross-section of two decorative panels as shown in FIG. 1a, 2a or 3a in a first, second and third coupled condition respectively;

DETAILED DESCRIPTION OF THE INVENTION

Figure 1A:
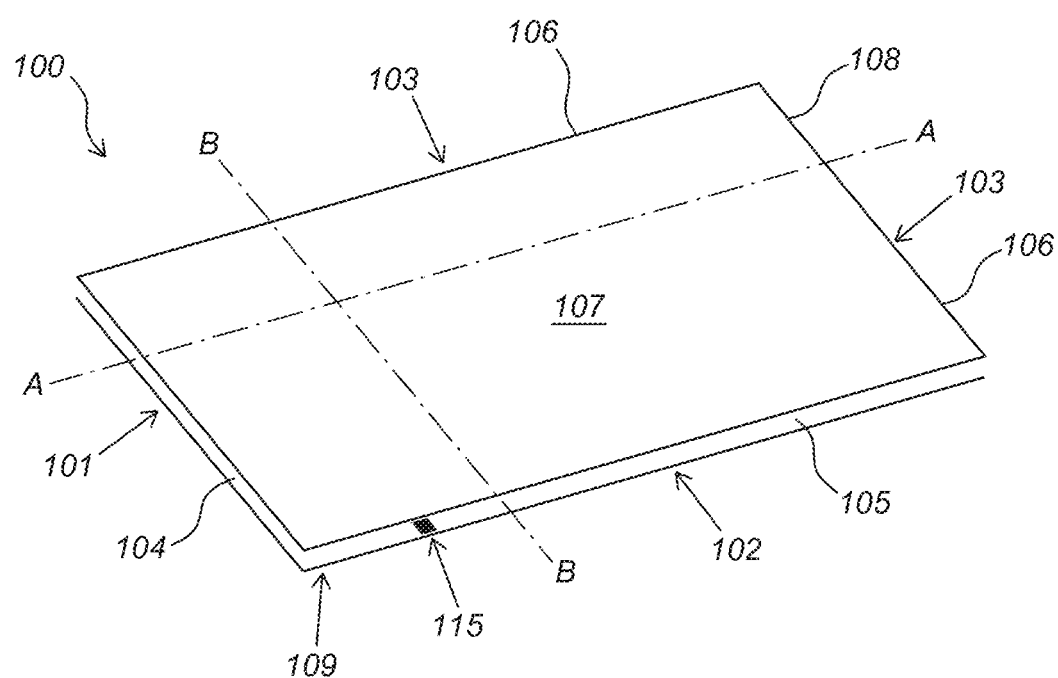
FIGS. 1a-1b show a top view of schematic representation of possible embodiments of decorative panels according to the present invention.

FIG. 1a shows a schematic representation of a decorative panel (100) for use in a decorative panel system (110). The figure shows a panel (100) comprising a core having an upper side (107) and a lower side. A decorative layer is affixed to the said upper side (107) and a backing layer is affixed to the said lower side, forming the bottom side (109). The panel (100) further comprises a first pair of opposing edges comprising a first edge (101) and an opposite third edge (103) and a second pair of opposing edges comprising a second edge (102) and an opposing third edge (103). The first, second and third edges (101, 102, 103) are respectively provided with first, second and third coupling profiles (104, 105, 106). The first coupling profile (104) and the third coupling profile (106) are configured such that two of such panels (100) can be coupled to each other at the first and third edges (101, 103) by means of a turning movement. Moreover, the second coupling profile (105) and the third coupling profile (106) are configured such that the two of such panels (100) can be coupled to each other at the second and third edges (102, 103) by means of a fold-down movement and/or a vertical movement. Additionally, an information carrying element (115) is arranged in the core or affixed on the bottom side (109), not shown in this figure. This information carrying element (115) is shown as a scannable code and comprises information about the panel (100), such an instruction about the installation of the decorative panels (100) into a decorative panel system (110) or it contains information about the origin of the materials used in the panel (100). The proportional relationship between the width and the length of the panel (100) may be chosen at will. FIG. 1a shows only one of the many possibilities wherein the panel has a upper side (107) with a rectangular contour (108). It is however also possible that the width and the length of the panel (100) are the same such that the panel (100) has an upper side (107) with a square contour.

Figure 1B:
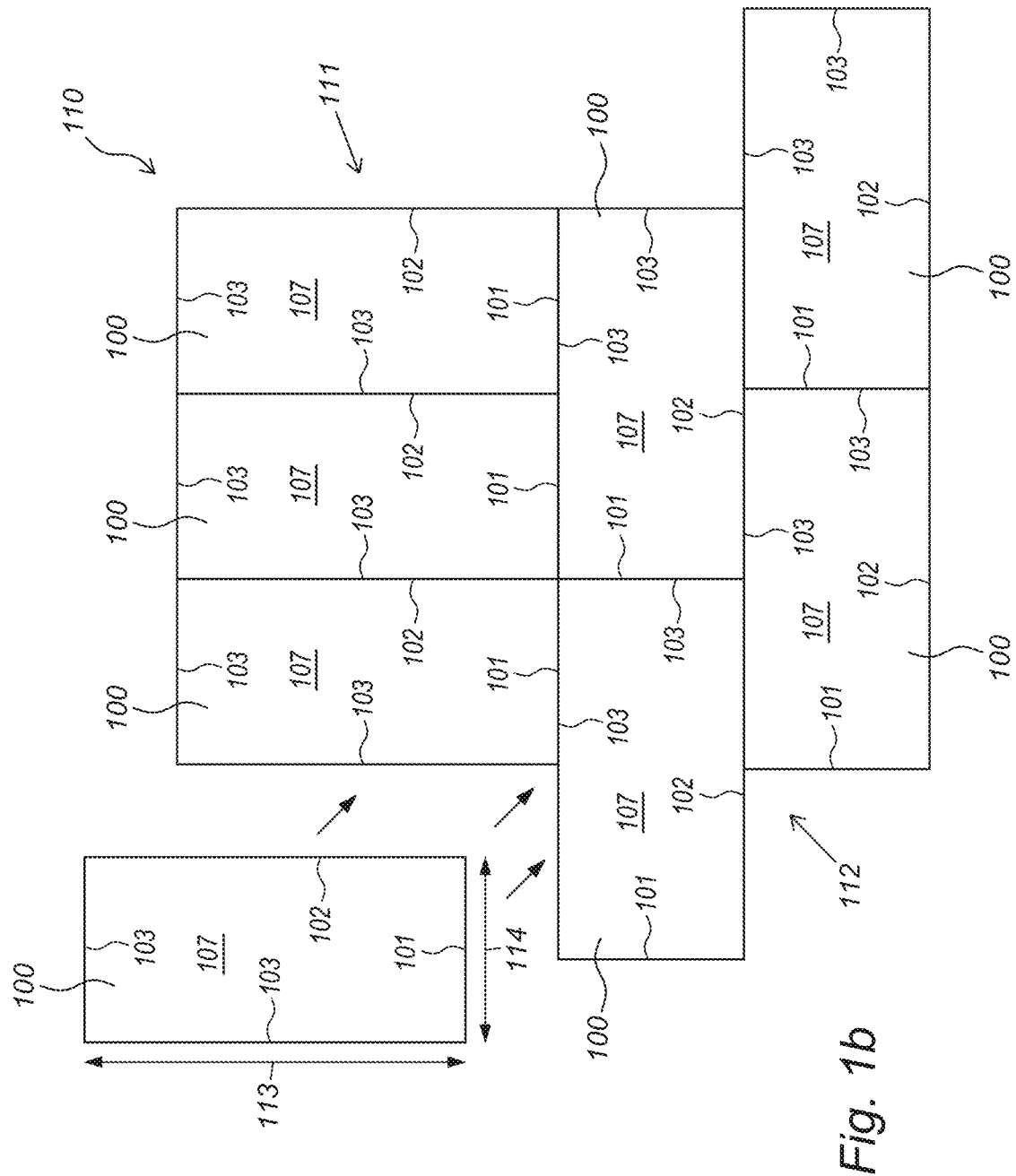

FIG. 1b shows a schematic representation of a decorative panel system (110) comprising a plurality of decorative panels (100) as shown in FIG. 1a. Although each of the panels (100) are equivalent, having a first pair of opposing edges consisting of a first edge (101) and an opposite third edge (103) and a second pair of opposing edges consisting of a second edge (102) and an opposing third edge (103), the panels (100) may, due to the compatibility of the coupling profile of the third edge (103) with the coupling profile of both the first and the second edge (101, 102), be joined in different ways, resulting in differential panel patterns (111, 112) within one decorative panel system (110). In the depicted decorative panel system (110) wherein the individual panels (110) have an upper side (107) with a rectangular contour (108), the panels (100) each have a long side (113) and a short side (114). The different panel patterns (111, 112) are hereby created by coupling a first panel pattern (111) of interconnected panels (100), having their long side (113) connected to the long side (113) of an adjacent panel (100), to a second panel pattern (112) of interconnected panels (100), having their long side (113) connected to the long side (113) of an adjacent panel (100) and their short side (114) connected to the short side (114) of another adjacent panel (100). The first and second panel patterns (111, 112) are hereby rotated to each other such that the long sides (113) of the panels (100) of the first panel pattern (111) lie at a 90 degree angle relative to the long sides (113) of the panels (100) of the second panel pattern (112). This coupling between the different panel patterns (111, 112) is made possible through the connection of the short sides (114) of the panels (100) of the first panel pattern (111) to the long sides (113) of the panels (100) of the second panel pattern (112). Installation of the panel system (110) can be realized by angling down the first edge (101) of a panel (100) to be installed with respect to a third edge (103) of an already installed panel (100), which will commonly mutually lock said panels (100) in both vertical and horizontal direction. During this angling or turning movement of the panel (100) to be installed with respect to the already installed panel (100), the second edge (102) of the panel (100) to be installed will be connected (simultaneously) to the third edge (103) of another already installed panel (100), which is typically realized by lowering or folding down the panel (100) to be installed with respect to the other already installed panel (100) during which the second edge (102) of the panel (100) to be installed and the third edge (103) of the other already installed panel (100) will be scissored (zipped) into each other. This results in a locking of the panel (100) to be installed with respect to the other already installed panel (100) both in horizontal and vertical direction.

Figure 2A:
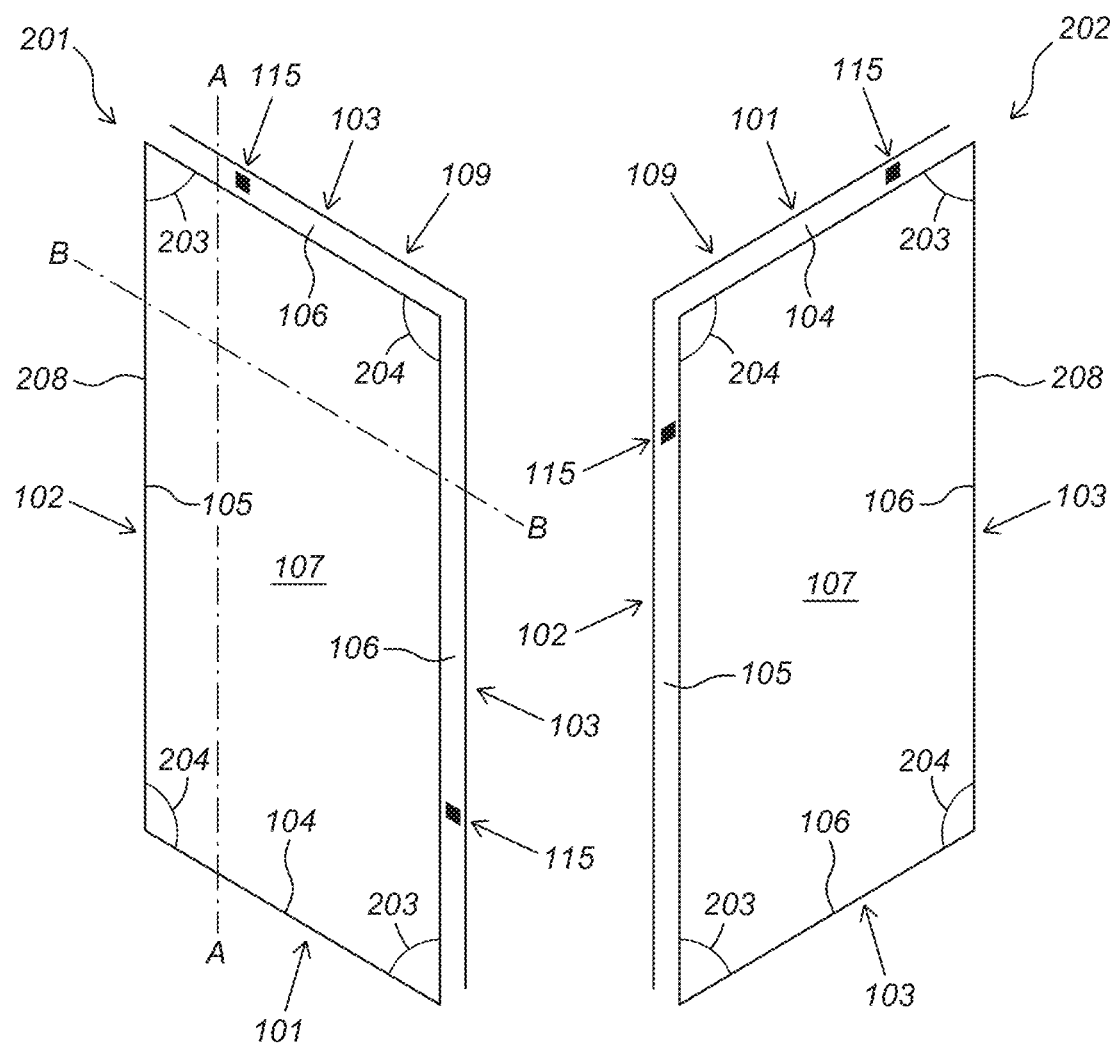
FIGS. 2a-2b show a top view of schematic representation of another possible embodiment of decorative panels according to the present invention.

FIG. 2*a* shows a schematic representation of two different types of decorative panels (201, 202) for use in another embodiment of a decorative panel system (200). Just as the decorative panel (100) shown in FIG. 1*a*, each of these panels (201, 202) comprises a core having an upper side (107) and a lower side, and each of these panels (201, 202) comprises a first pair of opposing edges comprising a first edge (101) and an opposite third edge (103) and a second pair of opposing edges comprising a second edge (102) and an opposing third edge (103). Again, the first, second and third edges (101, 102, 103) are respectively provided with first, second and third coupling profiles (104, 105, 106), wherein the first coupling profile (104) and the third coupling profile (106) are configured such that two panels (201, 202) can be coupled to each other at the first and third edges (101, 103) by means of a turning movement, and the second coupling profile (105) and the third coupling profile (106) are configured such that the two panels (201, 202) can be coupled to each other at the second and third edges (102, 103) by means of a fold-down movement and/or a vertical movement. A plurality of information carrying elements (115) are arranged at multiple locations in the core or on the bottom side (109), not shown in this figure, of the panels (201, 202), wherein each information carrying element (115) comprises information about a panel characteristic. This time however, there are two different types of panels (201, 202), wherein the coupling profiles (105, 106) of one pair of opposing edges (102, 103) on the first type of panel (201) are arranged in a mirror-inverted manner relative to the coupling profiles (105, 106) of the corresponding pair of opposing edges (102, 103) on the second type of panel (202). Note that the depicted edge pairs of the different types of panels (201, 202) that are mirror-inverted are formed by second and third edges (102, 103). However it is likewise possible that the mirror-inverted edge pairs are formed by first and third edges (101, 103). Moreover, the decorative panels (201, 202) for use in this decorative panel system (200) have an upper side (107) with a parallelogram-shaped contour (208).

Two adjoining edges (101, 102, 103) of these panels (201, 202) hereto either enclose an acute angle (203) or a obtuse angle (204). In this specific embodiment, the first and second edge (101, 102) respectively the third edges (103) enclose an obtuse angle (204) of the same size, while the first and the third edge (101, 103) respectively the second and third edge (102, 103) enclose an acute angle (203) of the same size. The difference in panel configuration and parallelogram-shaped contour (208) of their upper side (107) allows these panels (201, 202) to form a chevron pattern (205) in a joined state.

Figure 2B:
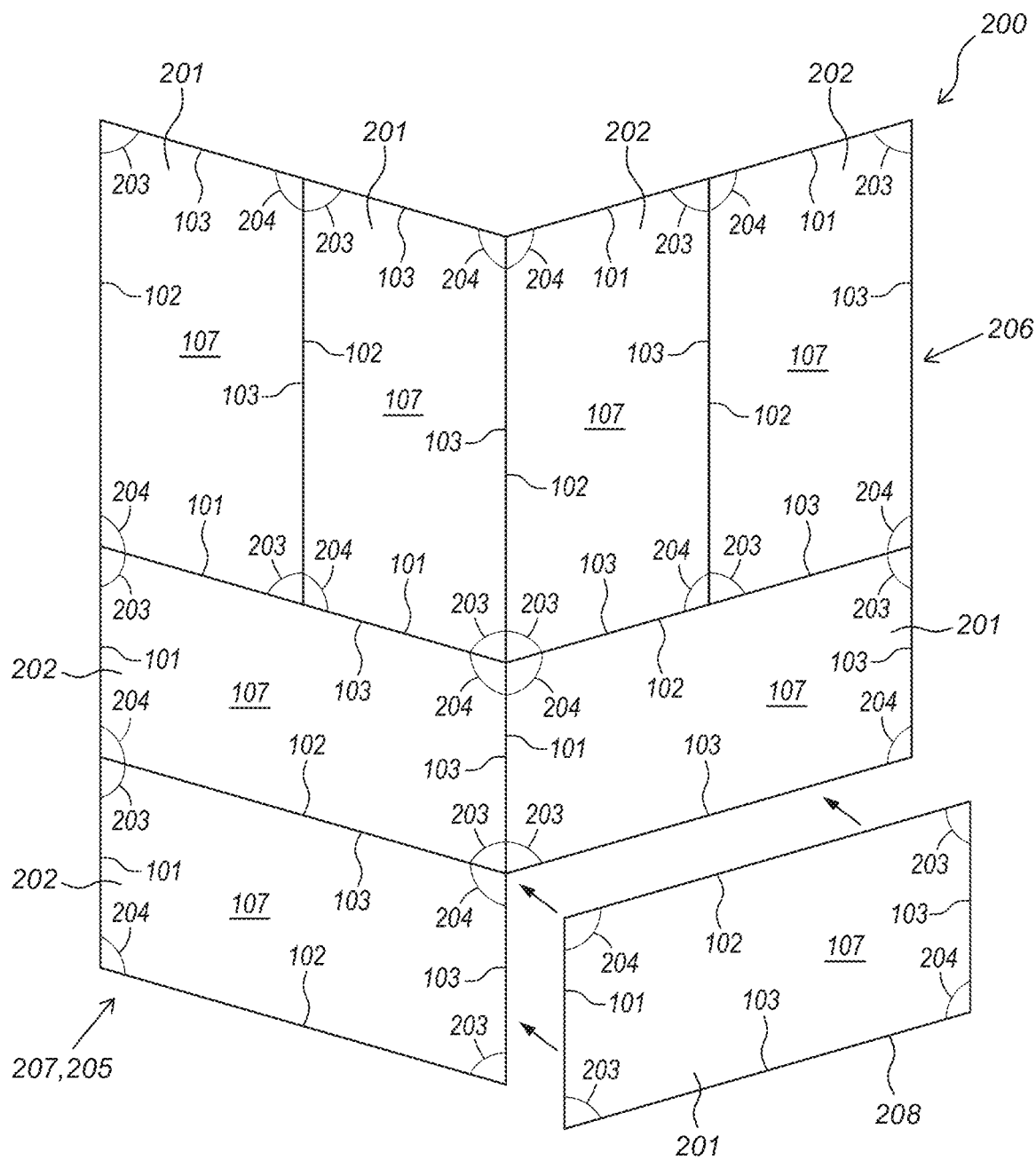

FIG. 2*b* shows a schematic representation of a decorative panel system (200) comprising a plurality of decorative panels (201, 202) as shown in FIG. 2*a*. As already discussed previously, the decorative panels (201, 202) forming part of this decorative panel system (200) come in two different (mirrored) types/configurations. While the difference in panel configuration and parallelogram-shape of their top surface (107) allows these panels (201, 202) to form a chevron pattern (205) in a joined state, having a first pair of opposing edges consisting of a first edge (101) and an opposite third edge (103) and a second pair of opposing edges consisting of a second edge (102) and an opposing third edge (103), wherein the coupling profile (106) of the third edge (103) is compatible with the coupling profile (104, 105) of both the first and the second edge (101, 102), allows the panels (201, 202) to be joined in different ways as well, resulting in differential panel patterns (206, 207) within one interconnected decorative panel system (200). Like in the decorative panel system (110) shown in FIG. 4*b*, the different panel patterns (206, 207) are created by coupling a first panel pattern (206) of interconnected panels (201, 202) to a second panel pattern (207) of interconnected panels (201, 202). Within these separate panel patterns (206, 207), each panel (201, 202) has each of its pairs of opposing edges (101, 103; 102, 103) connected to the edges (101, 102, 103) of adjacent panels (201, 202) being part of a corresponding pair of opposing edges (101, 103; 102, 103) of said adjacent panels (201, 202). The coupling of the first and second panel patterns (206, 207) is however realized through the connection of a panel (201, 202) of first panel pattern (206) with an edge (101, 103) forming part of one pair of opposing edges (101, 103) to a panel (201, 202) of second panel pattern (207) with an edge (102, 103) forming part of the other, non-corresponding pair of opposing edges (102, 103). The result is an interconnected, decorative panel system (200) comprising two different panel patterns (206, 207), wherein the edges (101, 102, 103) of adjacent panels (201, 202) are rotated 70 degrees relative to each other. Installation of the panel system (200) shown in FIG. 2*b* is typically analogous to the installation of the panel system (110) shown in FIG. 1*b*.

Figure 3A:
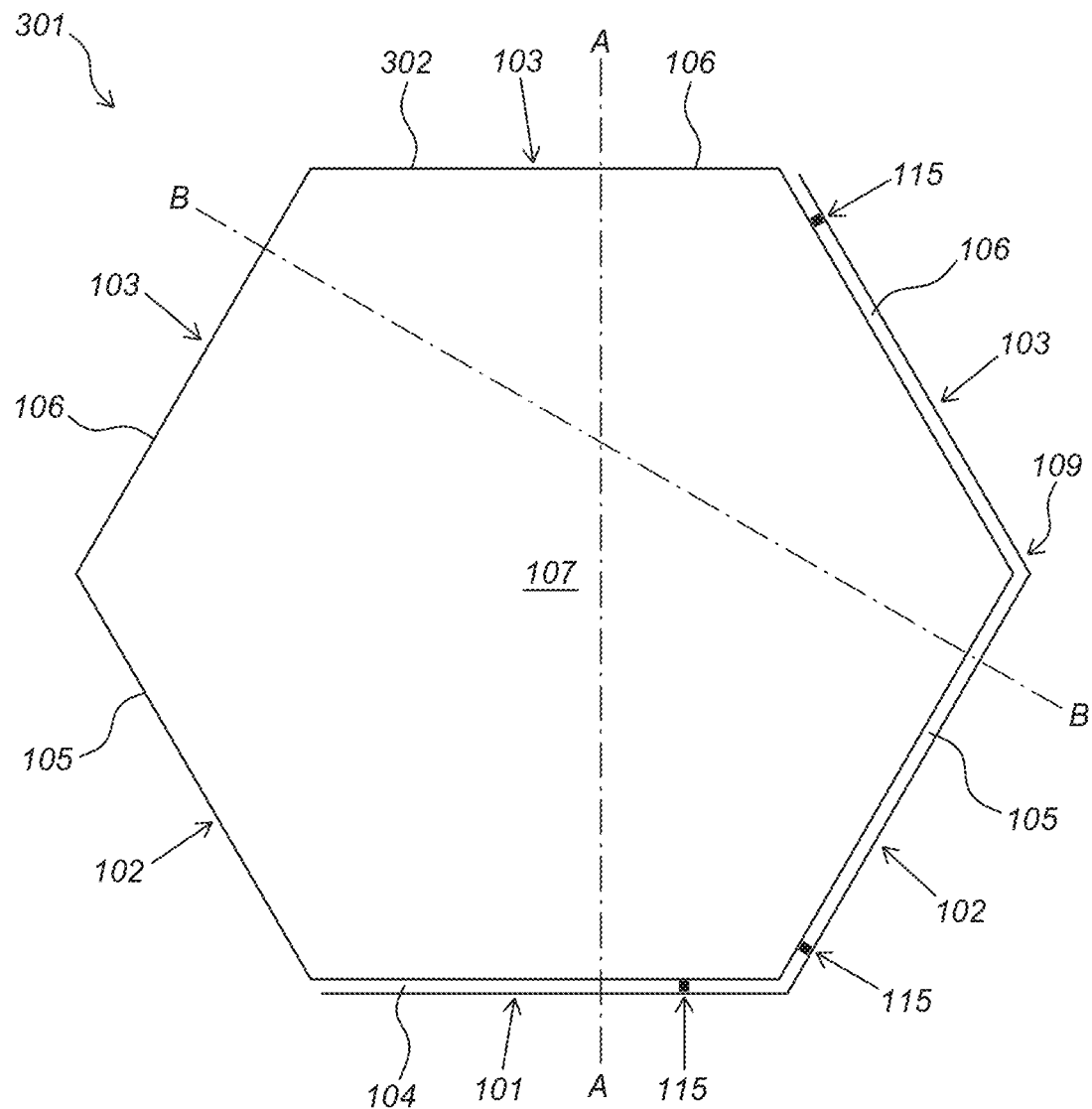
FIGS. 3a-3b show a top view of schematic representation of yet another possible embodiment of decorative panels according to the present invention.

FIG. 3*a* shows a schematic representation of a decorative panel (301) for use in yet another embodiment of a decorative panel system (300). Like the decorative panels (100, 201, 202) shown in FIG. 1*a* and FIG. 2*a*, comprises this panel (301) a core having an upper side (107) and a lower side. Just as the decorative panels (201, 202) comprises this panel (301) a plurality of information carrying elements (115) which are arranged at multiple locations in the core or on the bottom side (109), not shown in this figure, of the panel (301), wherein each information carrying element (115) comprises information about a panel characteristic. Other than the decorative panels (100, 201, 202) shown in FIGS. 1a and 2a, each of these panels (301) comprises three pairs of opposing edges and has an upper side (107) with a regular hexagon-shaped contour (302). The first pair of opposing edges consists of a first edge (101) and an opposite third edge (103). The second and third pair of opposing edges consist of a second edge (102) and an opposing third edge (103). The first, second and third edges (101, 102, 103) are hereby positioned such that the third edges (103) lie directly adjacent to each other and the second edges (102) lie on both edges adjacent to the first edge (101). The second edges (102), as a consequence, do not lie adjacent to each other. These decorative panels (301) have likewise the decorative panels (100, 201, 202) shown in FIGS. 1a and 2a first, second and third edges (101, 102, 103) that are respectively provided with first, second and third coupling profiles (104, 105, 106), wherein the first coupling profile (104) and the third coupling profile (106) are configured such that two panels (301) can be coupled to each other at the first and third edges (101, 103) by means of a turning movement, and the second coupling profile (105) and the third coupling profile (106) are configured such that the two panels (301) can be coupled to each other at the second and third edges (102, 103) by means of a fold-down movement and/or a vertical movement.

Figure 3B:
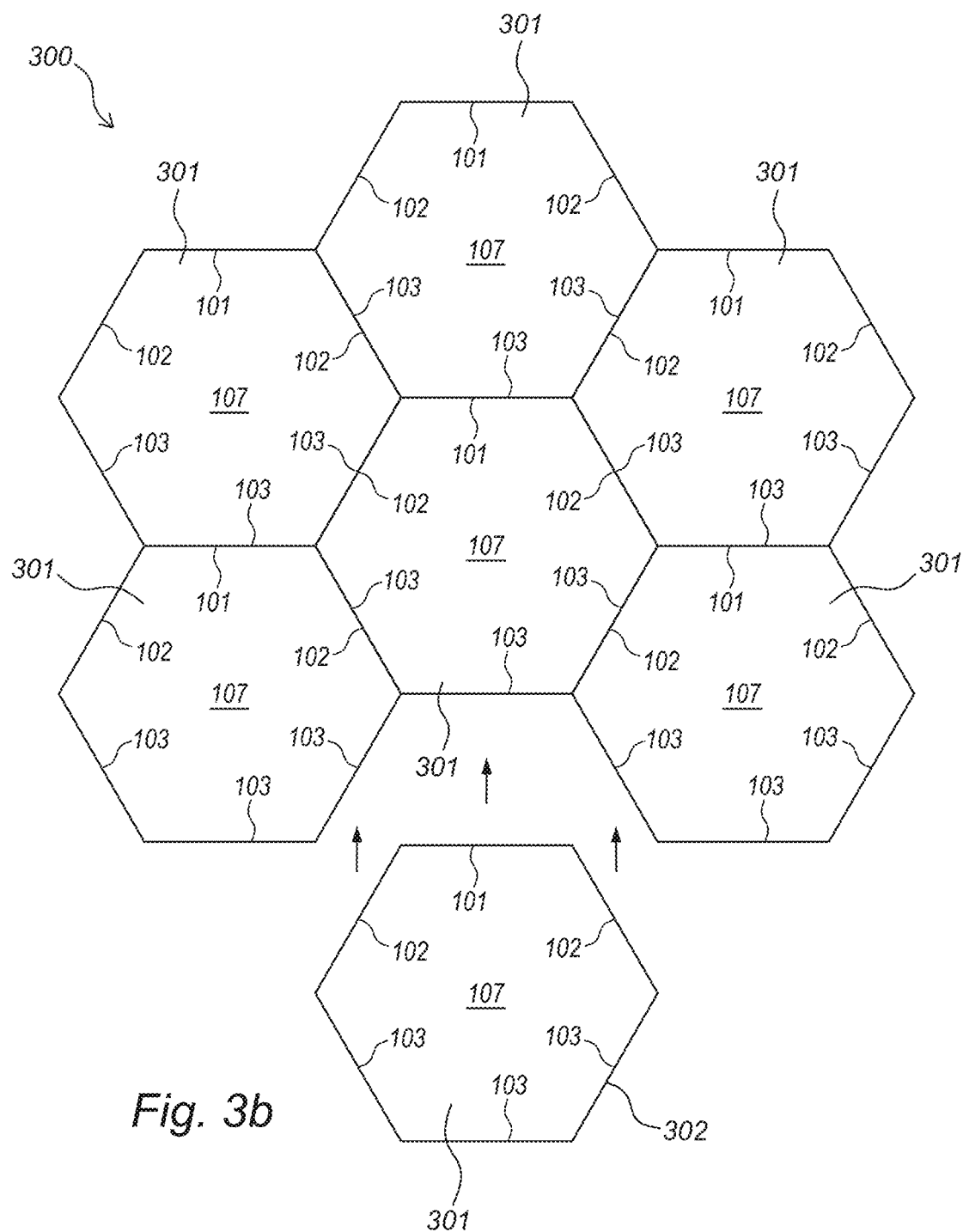

FIG. 3b shows a schematic representation of a decorative panel system (300) comprising a plurality of decorative panels (301) as shown in FIG. 3a. In the depicted panel formation, the panels (301) are all identically oriented. Installation of the panel system (300) can be realized in a similar fashion as the panel systems (110, 200) of FIGS. 1b and 2b. By angling down the first edge (101) of a panel (301) to be installed with respect to a third edge (103) of an already installed panel (301), said panels (301) will commonly mutually lock in both vertical and horizontal direction. During this angling or turning movement of the panel (301) to be installed with respect to the already installed panel (301), one or more second edges (102) of the panel (300) to be installed will be connected (simultaneously) to a third edge (103) of one or more other already installed, adjacent panels (301), which is typically realized by lowering or folding down the panel (301) to be installed with respect to the other already installed panel(s) (301) during which said second edge(s) (102) of the panel (301) to be installed and the third edge(s) (103) of the other already installed panel(s) (301) will be scissored (zipped) into each other. This results in a locking of the panel (301) to be installed with respect to the other already installed panel(s) (301) both in horizontal and vertical direction.

Figure 4A:
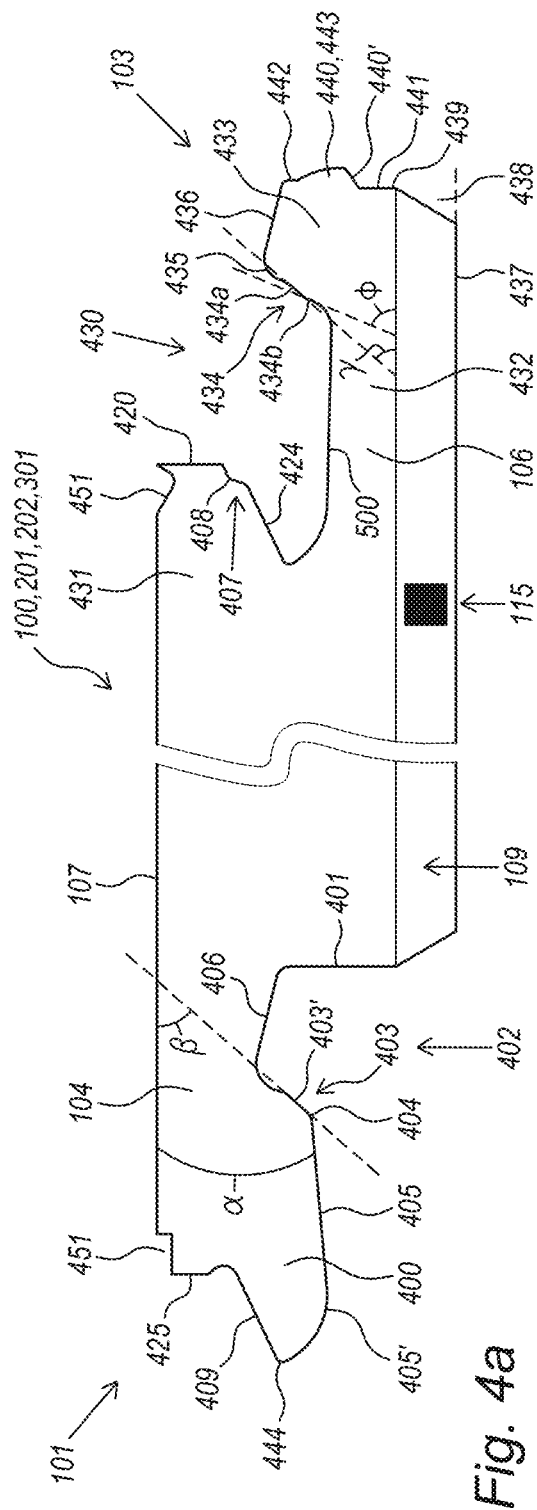

FIG. 4a shows a cross-section along line A-A of a decorative panel (100, 201, 202, 301) as shown in FIG. 1a, 2a or 3a. On the bottom side (109) of the decorative panel (100, 201, 202, 301) is at least one information carrying element (115) affixed. In the figure, the first edge (101) and an opposing third edge (103) of the panel (100, 201, 202, 301) are visible, having a first coupling profile (104) and a third coupling profile (106) respectively. The first coupling profile (104) comprises a sideward tongue (400) extending in a direction substantially parallel to the upper side (107) of the panel (100, 201, 202, 301), at least one first downward flank (401) lying at a distance from the sideward tongue (400), and a first downward recess (402) formed between the sideward tongue (400) and the first downward flank (401). Said first downward flank (401) is in particular free of any locking element. The proximal side (403) of the sideward tongue (400) of the first coupling profile (104), facing the first downward recess (402), is hereby downwardly inclined in a direction away from the first downward flank (401). The proximal side (403) of the sideward tongue (400) may comprise a first proximal side contact portion (403'), wherein said first proximal side contact portion (403') co-acts with the third upper contact portion (434a) of the upward locking element (433) of the third coupling profile (106). In order to realise an efficient locking between the first and third coupling profiles (103, 106), the first proximal side contact portion (403') is at an angle (β) with respect to the upper side (107) of the panel (100, 201, 202, 301). Said angle (β) should preferably be situated between 20 degrees and a maximum of 50 degrees.

Said absolute values turned out to allow for an easy coupling and decoupling. A first transition zone (404), which may also be referred to as a heel, can be defined between the proximal side (403) of the sideward tongue (400) of the first coupling profile (104) and a bottom side (405) of the sideward tongue (400) of the first coupling profile (104), which first transition zone (404) is in this instance curved. The bottom side (405) of the sideward tongue (400) is situated between a tip (444) and the heel (404) of the sideward tongue (400). The bottom side (405) of the sideward tongue (400) upwardly inclined in a direction towards the first downward flank (401), said inclined bottom side (405) is in particular at an angle (α) with respect to the upper side (107) of the panel (100, 201, 202, 301). The angle (α) may be relatively small, but significantly contributes to the inventive concept of the present invention since it allows an easier angling down movement by reducing the contact surface at the stage of placing the panel (100, 201, 202, 301). The upper side (406) of the first downward recess (402) is in the depicted panel (100, 201, 202, 301) inclined downwardly towards the first downward flank (401). The first coupling profile (104) may furthermore comprise a first bottom side contact portion (405'), which first bottom side contact portion (405') may, during a coupling movement, partially slide over a support surface (500) which is formed by an upper side of the lower lip (432) of the third coupling profile (106). Moreover, the sideward tongue (400) comprises a sideward tongue contact portion (409), which sideward tongue contact portion (409) co-acts with a portion of the third coupling profile (106). Situated between said sideward tongue contact portion (409) and the upper side (107) of the panel (100, 201, 202, 301) there may be a first closing surface (425).

The third coupling profile (106) comprises a third recess (430) configured for accommodating at least a part of the sideward tongue (400) of the first coupling profile (104) of a further panel (100, 201, 202, 301), said third recess (430) being defined by an upper lip (431) and a lower lip (432), wherein said lower lip (432) is provided with an upward locking element (433). The upper lip (431) further comprises a third closing surface (420) and an upper lip contact portion (424), wherein said third closing surface (420) and upper lip contact portion (424) are situated at opposite sides of a fifth locking element (407), which in this instance is formed by a cut-out portion (408). The proximal side (434) of the upward locking element (433) of the third coupling profile (106), facing the third recess (430), is upwardly inclined in a direction away from the upper lip (431). The proximal side (434) of the upward locking element (433), comprises a third upper and third lower contact portion (434a, 434b), wherein said third upper and third lower contact portions (434a, 434b) are extending in a first direction and a second direction, said second direction deviating from said first direction. The third lower and third upper contact portions (434a, 434b) are connected via at least one intermediate curved zone, which in this instance is a convex zone. Preferably, said third upper contact portion (434a) extending in the first direction is inclined at a second angle (γ) with respect to the lower side (437) of the lower lip (432). The third lower contact portion (434b) extending in the second direction is inclined at a first angle (φ) with respect to the lower side (437) of the lower lip (432). Said second angle (γ) may be substantially similar compared to the angle (β) of the first proximal side contact portion (403') of the sideward tongue (400) of a second panel (100, 201, 202, 301), such that these contact portions (434a, 403') mutually co-act in a locked configuration. It is preferred that the second angle (γ) is smaller with respect to the first angle (φ). A third transition zone (435) can be defined between the proximal side (434), in particular the third upper contact portion (434a) thereof, of the upward locking element (433) and an upper side (436) of the upward locking element (433), which third transition zone (435) is in this instance partially deviates from the curved first transition zone (404). The upper side (436) of the upward locking element (433) is in the depicted panel (100, 201, 202, 301) inclined downwardly in a direction facing way from the upper lip (431) of the third coupling profile (106). At the lower side (437) of the lower lip (432) of the third coupling profile (106), a recess (438) is present. This recess (438) allows bending of the lower lip (432) in a downward direction, in particular during coupling. The third coupling profile (106) may further comprise a third locking element (440) that may co-act with a second locking element (422) of the second coupling profile (105) of an adjacent panel (100, 201, 202, 301) to establish a vertical lock between the coupled panels (100, 201, 202, 301). The third locking element (440) may hereto be provided at a distal side (441) of the lower lip (432) facing away from the third recess (430) and/or at a distal side (442) of the upward locking element (433) facing away from the third recess (430). The third locking element (440) may, as depicted here, specifically be positioned at a distance both from a lower side (437) of the lower lip (432) and an upper side (436) of the upward locking element (433). In the presently depicted panel, the third locking element (440) comprises at least one outward bulge (443) which outward bulge (443) may be provided with an third locking element contact portion (440'), wherein said third locking element contact portion (440') is configured to co-act with at least one second locking element (422) of the second coupling profile (105), in particular with a second locking element contact portion (422') thereof, of an adjacent coupled panel (100, 201, 202, 301) for the purpose of realizing a (vertically) locked coupling.

Figure 4B:
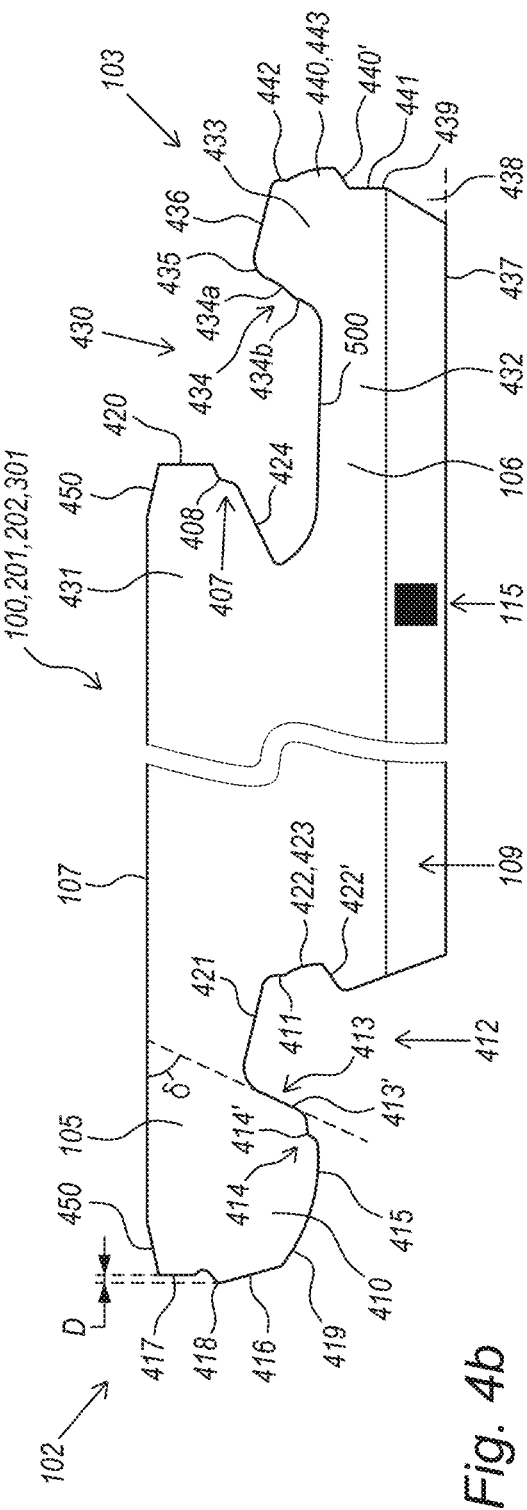

FIG. 4b shows a cross-section along line B-B of a decorative panel (100, 201, 202, 301) as shown in FIG. 1a, 2a or 3a. On the bottom side (109) of the decorative panel (100, 201, 202, 301) is at least one information carrying element (115) affixed. In the figure, the second edge (102) and another opposing third edge (103) of the panel (100, 201, 202, 301) are visible, having a second coupling profile (105) and a third coupling profile (106) respectively. Where the third coupling profile (106) matches the third coupling (106) profile provided on the adjacent third edge (103) of the panel (100, 201, 202, 301), which characteristics are given above in the description of the cross-section along line A-A of the decorative panel (100, 201, 202, 301), the second coupling profile (105) comprises a downward tongue (410) extending in a direction substantially perpendicular to the upper side (107) of the panel (100, 201, 202, 301), at least one second downward flank (411) lying at a distance from the downward tongue (410), and a second downward recess (412) formed between the downward tongue (410) and the second downward flank (411). The proximal side (413) of the downward tongue (410) of the second coupling profile (105), facing the second downward recess (412), is hereby downwardly inclined in a direction away from the second downward flank (411). The proximal side (413) of the downward tongue (410) comprises at least one second proximal contact portion (413'), wherein said second proximal contact portion (413') is at an angle (δ) with respect to the upper side (107) of the panel (100, 201, 202, 301). Preferably, said angle (δ) may be substantially similar compared to the first angle (φ) of the third lower contact portion (434b) of the third coupling profile (106) of a second panel (100, 201, 202, 301), such that these contact portions (413', 434b) mutually co-act in a locked configuration of a second transition zone (414), which may also be referred to as a heel can be defined between the proximal side (413) of the downward tongue (410) of the second coupling profile (105) and a bottom side (415) of the downward tongue (410) of the second coupling profile (105), which heel (414) is in this instance provided with a cut-out portion (414'). The cut-out portion (414') is provided such as to facilitate the uncoupling of the second coupling and third coupling profiles (105, 106). Said cut-out portion (414') is configured to allow the downward tongue (410) to pass over the convex portion connecting the third upper and lower contact portion (434a, 434b) of the third locking element (433). A distal side (416) of the downward tongue (410), facing away from the second downward recess (412), comprises at least a vertical upper wall part (417) adjacent to the upper side (107) of the panel (100, 201, 202, 301), and, adjacent to and located below said vertical upper wall part (417), a fourth locking element (418). Said fourth locking element (418) is in particular extending a distance (D) beyond the vertical upper wall part (417). The fourth locking element (418) is configured to co-act with a fifth locking element (407), wherein said fifth locking element (407) is in this instance formed by a cut-out part (408) of the upper lip (431) of the third coupling profile (106), wherein said cut-out part (408) of the fifth locking element (407) is configured to receive said protruding portion of the fourth locking element (418). The lower wall part (419) of distal side (416) of the downward tongue (410) may moreover be connected to the bottom side (415) of the downward tongue (410). Said bottom side (415) may comprise a bottom side contact portion (415') which may rest on a part of the support surface (500) of a third coupling profile (106). Said bottom side contact portion (415') is in particular formed by the part of the downward tongue (410) extending the furthest away from the upper surface (107). The upper side (421) of the second downward recess (412) is in the depicted panel (100, 201, 202, 301) inclined downwardly towards the second downward flank (411). The second coupling profile (105) may furthermore comprise at least one second locking element (422) which may, in a coupled position, co-act with a third locking element (440) of a third coupling profile (106) of an adjacent panel (100, 201, 202, 301) to establish a vertical lock between the panels (100, 201, 202, 301). The second locking element (422) may hereto be provided at the second downward flank (411) of the second coupling profile (105). In the presently depicted panel (100, 201, 202, 301), the second locking element (422) comprises at least one second locking recess (423) adapted to at least partially receive the outward bulge (443) of the third locking element (440) of an adjacent coupled panel (100, 201, 202, 301) for the purpose of realizing a (vertically) locked coupling. In particular a second locking element contact portion (422') of the second locking element (422) is configured to, in a coupled position, abut against the third locking element contact portion (440') of the third locking element (440) of an adjacent coupled panel (100, 201, 202, 301), such that the second and third coupling profile (105, 106) are locked both vertically and horizontally.

The coupling profiles (105, 106) of the decorative panels (100, 201, 202, 301) shown in FIG. 4b may optionally be provided with chamfers (bevels) (450) at or near the upper side (107) of the panels (100, 201, 202, 301). The coupling profiles (104, 106) of the decorative panels (100, 201, 202, 301) shown in FIG. 4a may optionally be provided with grouts (451) at or near the upper side (107) of the panels (100, 201, 202, 301). The grouts (451) may be either substantially rectangular shaped, such as seen at or near the upper side (107) of the first coupling profile (104). Said rectangular grout (451) may be either situated entirely on the first coupling profile (451) of one panel (100, 201, 202, 301) in FIG. 4a, or may be situated on both a first and third coupling profile (104, 106) of two adjacent panels (100, 201, 202, 301). However, it is also conceivable that a rounded grout (451) is applied, such as shown at or near the upper side (107) of the third coupling profile (106) in FIG. 4a. An advantage of these rounded grouts (451) is that water spilled on the upper side (107) of the panel (100, 201, 202, 301) will automatically flow towards the lowest part of said rounded grout, which may prevent water from ending up between two adjacent panels (100, 201, 202, 301). The skilled person would readily realize that any combination of grouts (451) and/or bevels (450) may be applied.

Figure 5C:
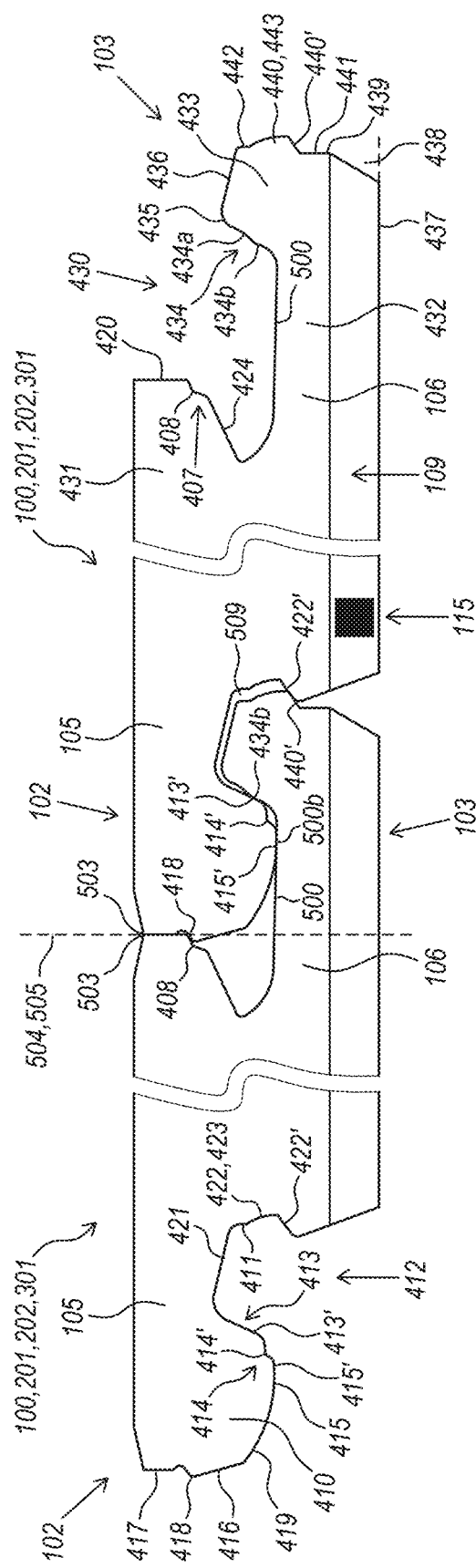

FIGS. 5a-5c show a cross-section of two decorative panels (100, 201, 202, 301) as shown in FIG. 1a, 2a or 3a in a first, second and third coupled condition respectively. FIGS. 5a and 5b each depict a mutual coupling of a first and third coupling profile (104, 106), wherein, FIG. 5a depicts a coupling of a first panel (100, 201, 202, 301) on the right with a second panel (100, 201, 202, 301) on the left, wherein the first panel (100, 201, 202, 301) is a cross-section along line A-A, and the second panel (100, 201, 202, 301) is a cross-section along line B-B. FIG. 5b depicts a coupling of a first panel (100, 201, 202, 301) on the right with a second panel (100, 201, 202, 301) on the left, wherein the first panel (100, 201, 202, 301) is a cross-section along line A-A, and the second panel (100, 201, 202, 301) is also a cross-section along line A-A. FIG. 5c depicts a mutual coupling of a second and third coupling profile (105, 106), wherein FIG. 5c depicts a coupling of a first panel (100, 201, 202, 301) on the right with a second panel (100, 201, 202, 301) on the left, wherein the first panel (100, 201, 202, 301) is a cross-section along line B-B, and the second panel (100, 201, 202, 301) is a cross-section along line B-B as well.

In the FIGS. 5a and 5b it can be seen that in coupled condition, at least a part of the sideward tongue (400) of the first coupling profile (104) of a panel (100, 201, 202, 301) is inserted into the third recess (430) of the third coupling profile (106) of an adjacent panel (100, 201, 202, 301), and at least a part of the upward locking element (433) of the third coupling profile (106) is inserted into the first downward recess (402) of the first coupling profile (104). To establish a fixation in the mutual position of the first coupling profile (104) and the third coupling profile (106), a part of a bottom side (405) of the sideward tongue (400), in particular the first bottom side contact portion (405') of the first coupling profile (104) may hereby be supported by a support surface (500), in particular by a second support portion (500a) of the support surface (500), of the third recess (430) of the third coupling profile (106). The first edge (101) and the third edge (103), in coupled condition, define a first closing surface (501) defined as a first vertical plane (502) through the upper edges (503) of the coupled panels (100, 201, 202, 301). In particular the third closing surface (430) of the third edge (103) abuts the first closing surface (425) of the first edge (101). The first closing surface (501) as defined by the first vertical plane (502) is thus laying between the third closing surface (430) and the first closing surface (425). Each of the sideward tongue (400) and the third recess (430) hereby extends through said first vertical plane (502).

At least a portion, in particular a distal portion of the sideward tongue (400) extends beyond the left side of the first vertical plane (502), where it clamps between a portion of the support surface (500), in particular the third support portion (500a) and a part of the upper lip contact portion (424). This clamping may be realized in different ways. It may be conceivable that the thickness of the sideward tongue (400), in particular a vertical line and/or portion extending from the bottom side contact portion (405') substantially vertically towards the sideward tongue contact portion (409). Said vertical line and/or portion is thicker compared to the vertical line and/or portion between the third support portion (500a) and a part of the upper lip contact portion (424), in particular the part of the upper lip contact portion (424) located vertically above the third support portion (500a). The different thickness may be a result of a marginal difference in the angle (i.e. a difference in angle of around 1 degree) between a first and second angle, the first angle may be defined by the upper side (107) and the sideward tongue contact portion (409), and the second angle may be defined by the upper side (107) and the upper lip contact portion (424). The difference in thickness allows the sideward tongue (400) to be clamped and vertically locking the mutual panels (100, 201, 202, 301). It is also conceivable that the shape of the sideward tongue (400) follows the contours of the inward portion of the third recess (430), such that in locked position the sideward tongue (400) exactly fits in said inward portion of the third recess (430) and mutually vertically locking the two panels (100, 201, 202, 301). In locked configuration, there is a first cavity (506) on the left of the tip (444) of the sideward tongue (400). This cavity (506) allows for a more easy coupling and decoupling of the two panels (100, 201, 202, 301), especially since the coupling and decoupling of the first and third coupling profile (104, 106) occur under an angling movement, wherein the sideward tongue (400) is angled into or out of the third recess (430). During this angling movement, the cavity (506) allows the tip (444) of the sideward tongue (506) to move, preventing that the sideward tongue (400) remains stuck as a result of friction between the tip (444) of the sideward tongue (400) and the third recess (430). Moreover, during this angling movement while coupling or decoupling the first and third coupling profiles (104, 106), the bottom side contact portion (405') functions as a gliding line contact, due to which line contact said bottom side contact portion (405') may easily slide over the support surface (500) of the third coupling profile (106). In the coupled position, the bottom side contact portion (405') will be supported by the third support portion (500a). Towards the heel (404) of the sideward tongue (400) there may be, in a coupled configuration of the first and third coupling profiles (104, 106), a second cavity (507). Due to said second cavity (507) there may be more space available during the angling movement for the sideward tongue (400), hence as a result of which allows for an easier coupling of the first and third coupling profiles (104, 106). In the coupled configuration, the first proximal side contact portion (403')

abuts the upper contact portion (434a) of the upward locking element (433), which results in a horizontal locking of the two panels (100, 201, 202, 301). This horizontal locking may be realized by friction between the first proximal side contact portion (403') and the upper contact portion (434a) of the upward locking element (433). On the right of the distal side (442) of the upward locking element (433) facing away from the third recess (430) there may be, in a coupled configuration of the first and third coupling profiles (104, 106), a third cavity (508). Due to this third cavity (508) there is an open space (508) between the first downward flank (401) and the lower lip (431), in particular the upward locking element (433). Due to this open space (508) the downward movement of the panel may be easier since there is substantially less, preferably no, friction between the first downward flank (401) and the distal side (442) of the upward locking element (433) facing away from the third recess (430).

FIG. 5c moreover shows that in coupled condition, at least a part of the downward tongue (410) of the second coupling profile (105) is inserted in the third recess (430) of the third coupling profile (106), and at least a part of the upward locking element (433) of the third coupling profile (106) is inserted in the second downward recess (412) of the second coupling profile (105). To establish a fixation in the mutual position of the second coupling profile (105) and the third coupling profile (106), a part of a bottom side (415) of the downward tongue (410), in particular the bottom side contact portion (415') of the second coupling profile (105) may hereby be supported by a support surface (500), in particular by a second support portion (500b) of the support surface (500), of the third recess (430) of the third coupling profile (106). The second edge (102) and the third edge (103), in coupled condition, define a second closing surface (504) defining a second vertical plane (505) through the upper edges (503) of the coupled panels (100, 201, 202, 301). The fourth locking element (418), or at least a part thereof, and the remaining part of the downward tongue (410) are situated at opposite sides of said second vertical plane (505), while the third recess (430) extends through said second vertical plane (505). Coupling of the second and third coupling profiles (105, 106) may be realized by lowering or folding down the second coupling profile (105), in particular the downward tongue (410) into the third coupling profile (106), in particular into the third recess (430) of an adjacent panel (100, 201, 202, 301). In this instance, at the top side (107) near the second vertical plane (505) there is a chamfer (bevel) provided on both the top side (107) of the second coupling profile (105) as well as the third coupling profile (106). These two chamfers mutually form a bevel at the vertical plane (505). On opposite sides of the vertical plane, near the top side (107) of the panels (100, 201, 202, 301) the third closing surface (420) of the third coupling profile (106) buts the vertical upper wall part (417) of the second coupling profile (105). Near the bottom portion of the vertical wall part (417) there is a cut-out part (408), said cut out part (408) forms a recess which extends in a direction facing away from the second vertical plane (505). Said cut-out part (408) is in particular configured for receiving the fourth locking element (418) during the folding down movement, such that a vertical locking may be realized. In a coupled condition, at least a part of the fourth locking element (418) is located on the side of the second vertical plane (505) facing away from the downward tongue (410). In order to make sure the entire fourth locking element (418) may be received by the cut-out part (408), the cut-out part (408) is larger compared to the fourth locking element (418). The fourth locking element (418) may in particular have a maximum width between 0.008 mm to 0.12 mm, measured in a direction perpendicular to, and from the vertical upper wall part (417). A bottom side contact portion (415') of the second coupling profile (105) is supported by a part of the support surface (500) of the third coupling profile (106). In particular, the bottom side contact portion (415') is supported by a second support portion (500b). Located towards the right of the bottom side contact portion (415') is a cut-out portion (414'), which serves to make a decoupling movement easier. The cut-out portion (414') in particular may allow the downward tongue (410) to move over the proximal side (434) of the upward locking element (433), in particular over the third upper and third lower contact portion (434a, 434b) thereof. Said third lower contact portion (434b) serves, in combination with the second proximal contact portion (413'), to achieve a horizontal locking of the downward tongue (410). This horizontal locking may be a result of the friction between the third lower contact portion (434b) and the second proximal contact portion (413'). The second proximal contact portion (413') may enclose an angle with the upper side (107) which may maximally be 70 degrees, but preferably is kept below the 65 degrees. Keeping the angle below this level will allow for an easier decoupling of the second and third coupling profiles (105, 106). Moreover, the downward tongue (410) may be shaped such that it, in coupled configuration, is clamped in the third coupling profile (106), in particular between the third closing surface (420) and the third lower contact portion (434b) thereof. Near the distal side (442) of the upward locking element (433), in coupled condition, there remains a fourth cavity (509). During the folding down movement, there is a minimal elastic deformation of the neck portion, i.e. the thinnest portion of the second coupling profile (105), which allows the second locking element (422) to move over the third locking element (440), formed by the outward bulge (443). In the final position, i.e. when the two panels (100, 201, 202, 301) are flush, the third locking element (440) comprises a bulge (443) with an inclined, substantially flat third locking surface (440'), and wherein the second locking element (422) comprises a recess (423) partially defined by an inclined, substantially flat second locking surface (422'), wherein said recess (423) is configured to accommodate at least a part of said bulge (443), and wherein said second locking surface (422') is configured to face, and preferably co-act, with said third locking surface (440').

Figure 6:
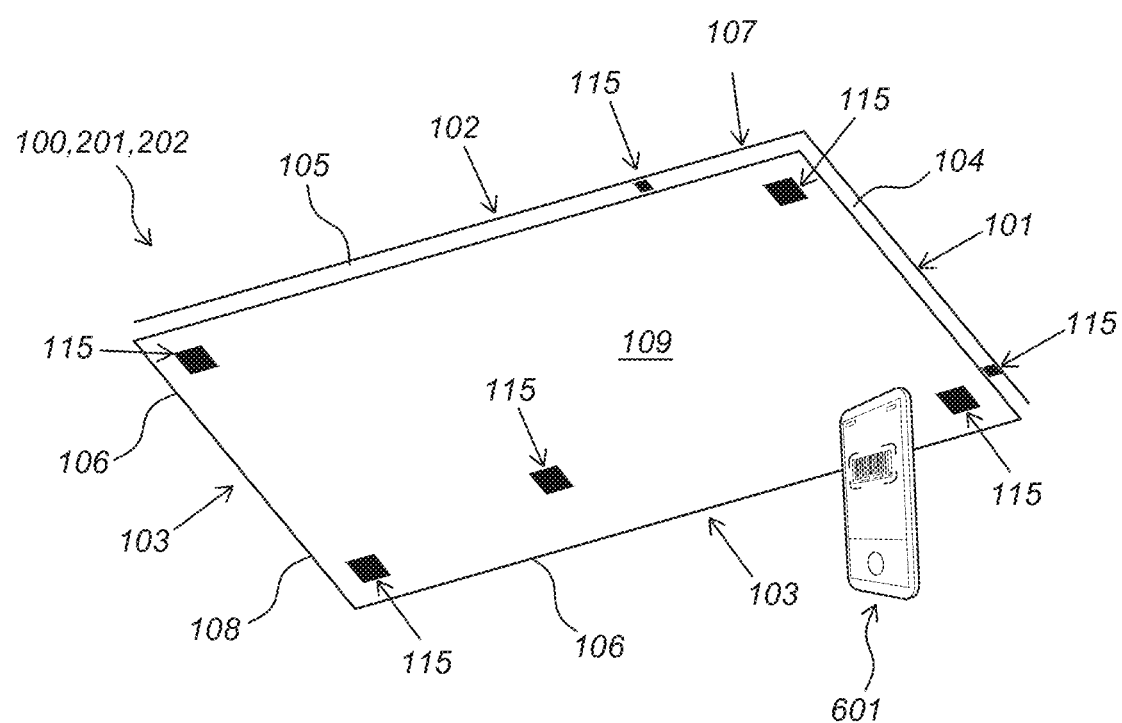
FIG. 6 shows a schematic representation of the bottom of a decorative panel according to the present invention.

FIG. 6 shows a schematic representation of the rear view of a decorative panel (100, 201, 202) as shown in FIG. 1a or 2a for the use in a decorative panel system (110, 200), comprising a core having an upper side (107) and a lower side. A decorative layer is affixed to the said upper side (107) and a backing layer is affixed to the said lower side forming the bottom side (109) of the decorative panel (100, 201, 202). A plurality of information carrying elements (115) are affixed to the core and/or the bottom side (109) of the decorative panel (100, 201, 202). These information carrying elements (115) comprise information about panel characteristics such as the material composition or it provides an installation instruction. The information carrying elements (115) are either directly readable or indirectly readable by the use of a machine (601) such as a phone or a scanner. After scanning the information carrying element (115) by a machine (601), the machine directs the user to an external digital platform which provides the user the desired information. The configuration shown in this figure could also be applied to another embodiment of the decorative panels, such as the embodiment of the decorative panels (301) in the decorative panel system (300) such as was shown in FIGS. 3a and 3b.

Figure 7A:
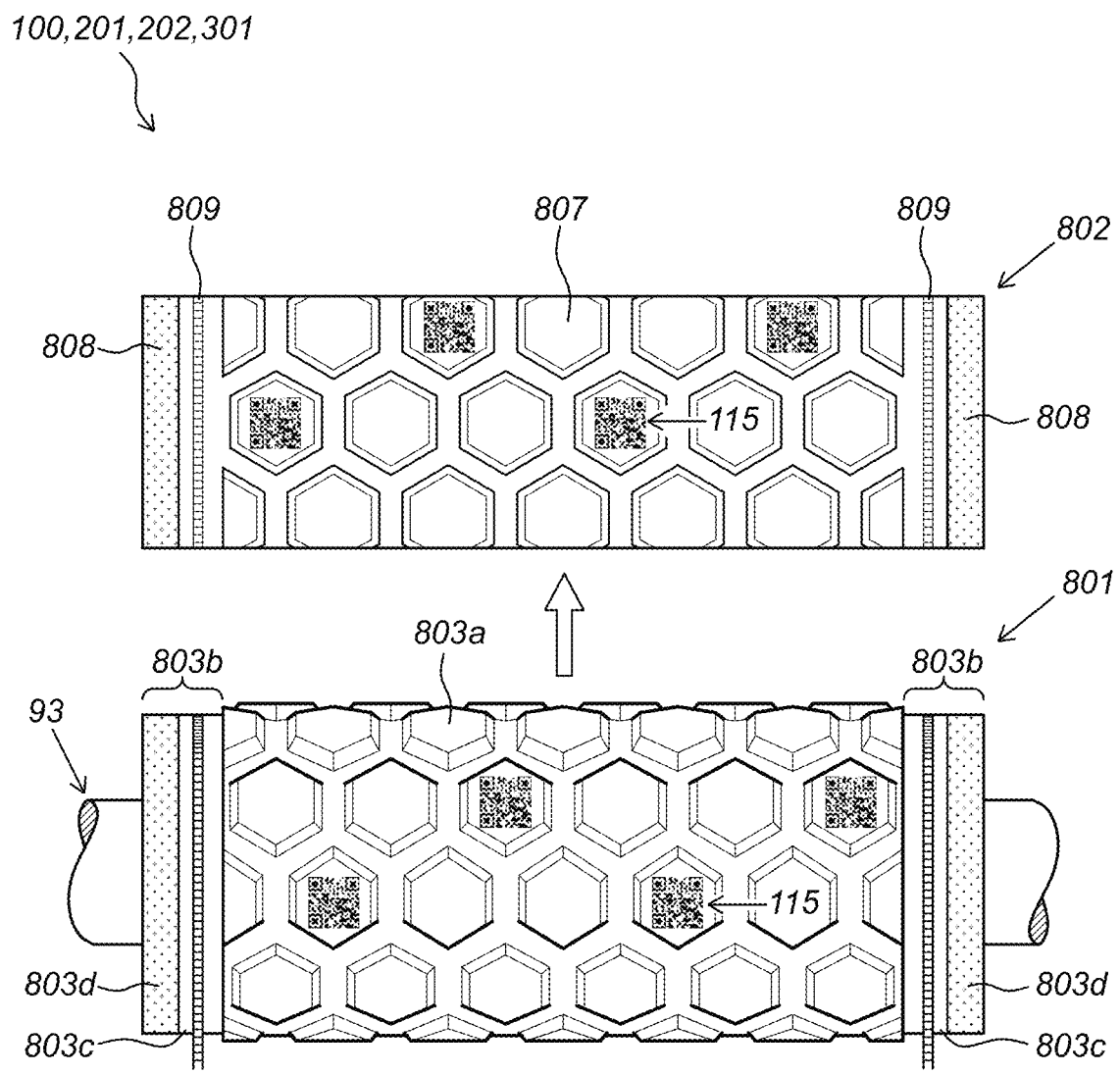
FIG. 7a shows a schematic representation of a possible application method of information carrying elements onto the lower side of the core of a decorative panel.

FIG. 7a shows the lower side of the core (802) of a decorative panel (100, 201, 202, 301) after being in contact with the showed profiled roller (801). The profiled roller (801) comprises protrusions that comprise a mirrored version of the information carrying element (115a). The decorative panel (100, 201, 202, 301) is brought into contact with said profiled roller (801), such that the mirrored information carrying element (115a) of the profiled roller (801) is pressed into the lower side of the core or onto the backing layer of the decorative panel (100, 201, 202, 301). This results in a decorative panel (100, 201, 202, 301) that comprises information carrying elements (115). The information carrying elements (115) can either be stamped, with ink or paint, or printed on the lower side of the core or onto the backing layer of the decorative panel (100, 201, 202, 301). Optionally, the profiled roller (801) is heated and thereafter brought into contact with the core of the decorative panel (100, 201, 202, 301). The mirrored information carrying element (115a) of the profiled roller (801) are then hot-pressed into the core resulting in a decorative panel (100, 201, 202, 301) comprising information carrying elements (115).

Figure 7B:
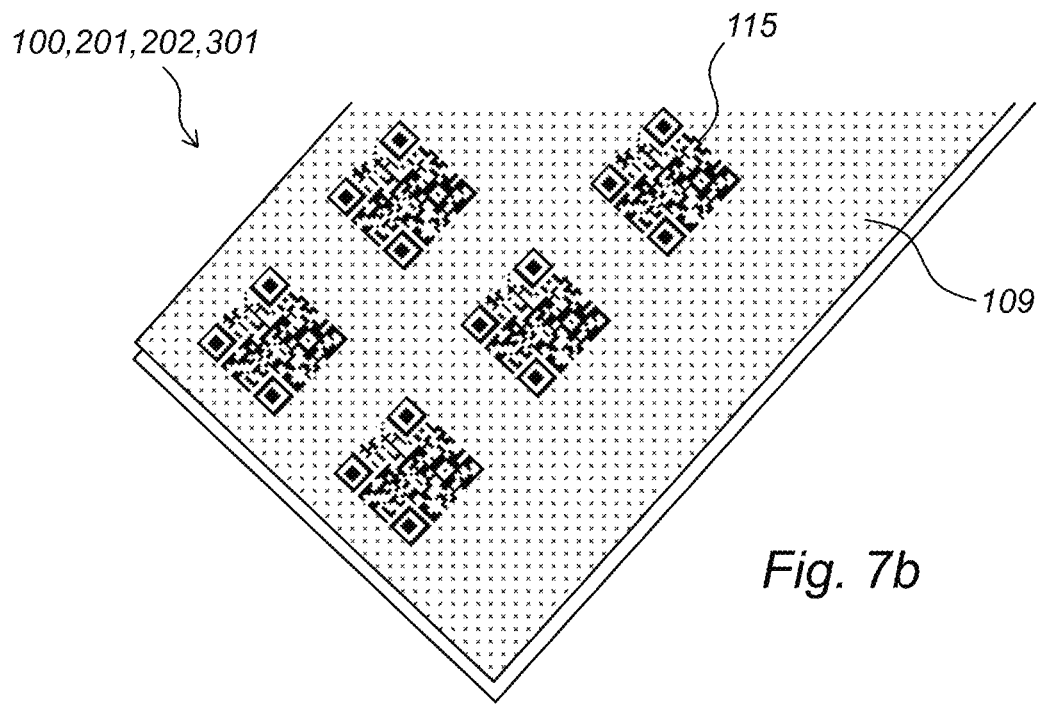
FIGS. 7b-7c show a rear view of schematic representation of possible embodiments of decorative panels according to the present invention.
Figure 7C:
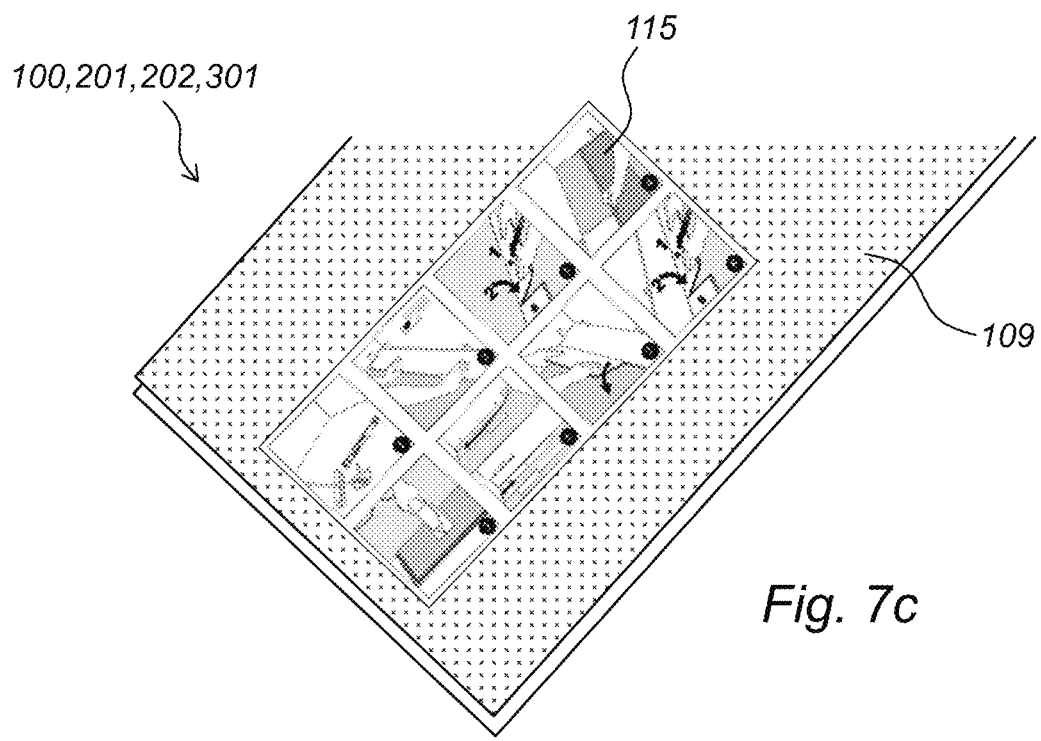

FIG. 7b and FIG. 7c show the result of a decorative panel (100, 201, 202, 301) comprising one, FIG. 7c, or multiple, FIG. 7b, information carrying elements (115) after the decorative panel (100, 201, 202, 301) is brought into contact with said profiled roller (801), FIG. 7a. FIG. 7b shows a multitude information carrying elements (115) affixed on the backing layer (109) of a decorative panel (100, 201, 202, 301). These information carrying elements (115) are machine-readable, here QR codes, direct to an external digital location. FIG. 3c shows one information carrying element (115) affixed to the backing layer (109) of a panel (100, 201, 202, 301). This information carrying element (115) is human-readable, here graphical information, which directly provides visual information.

Figure 8:
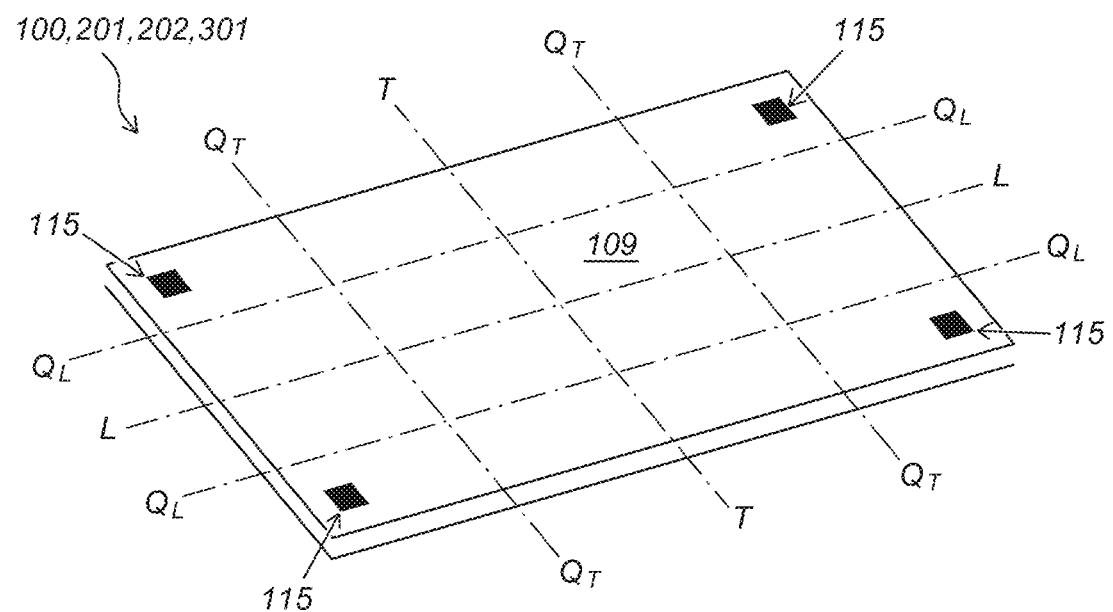
FIG. 8 shows a rear view of schematic representation of yet another possible embodiment of decorative panels according to the present invention.

FIG. 8 shows the rear side (109) of a rectangular panel (100, 201, 202, 301). The panel (100, 201, 202, 301) is divided into four quadrants by the intersection of a longitudinal axis (L) and a transverse axis (T). The longitudinal axis (L) intersects the transverse axis (T) in the centre point of the rectangular panel (100, 201, 202, 301) in this embodiment. The intersection of the two main principle axes (L, T) divides the panel in four equal-sized quadrants in this embodiment. Each of the four quadrants are further divided into four sub quadrants by the intersection of a longitudinal axis in the quadrant (QL) and a transverse axis in the quadrant (QT). The longitudinal axis in the quadrant (QL) intersects the transverse axis (T) and the transverse axis in the quadrant (QT) intersects the longitudinal axis (L). Four corner sub quadrants are located at the four corners of the rectangular panel (100, 201, 202, 301) at a distance from the main principle axes (L, T). The two intersecting auxiliary principle axes (QL, QT) divide the quadrants into four equal-sized sub quadrants in this embodiment. Four information carrying elements (115) are applied to the rear side of the panel (100, 201, 202, 301). In each quadrant of the panel (100, 201, 202, 301) an information carrying element (115) is applied. Each information carrying elements (115) is located in another sub quadrant of the panel (100, 201, 202, 301), in particular each information carrying element (115) is located in the corner sub quadrant.

Hence, the above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

By "horizontal" is meant a direction which extends parallel to a plane defined by the floor panel, and which may intersect the core. By "vertical" is meant a direction which is perpendicular to said plane defined by the floor panel. The ordinal numbers used in this document, like "first", "second", and "third" are used only for identification purposes. Hence, the use of the expressions "third locking element" and "second locking element" does therefore not necessarily require the co-presence of a "first locking element".

The "floor panel" according to the invention may also applied as wall covering element, ceiling covering element, or alternative covering element. In case in this document reference is made to a "floor tile" or "floor panel", these expressions may be replaced by expressions like "tile", "wall tile", "ceiling tile", "covering tile".

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel comprising:
   a. a core having a lower side and an upper side,
   b. a decorative top structure affixed, either directly or indirectly, to the upper side of the core, and
   c. at least one readable information carrying element carrying and/or provided with information relating to at least one panel related characteristic,
   wherein the at least one readable information carrying element is printed onto a rear side of the panel.

2. The panel according to claim 1, wherein the panel is a rectangular panel having two intersecting main principal axes dividing the panel into four quadrants, and wherein the panel comprises a plurality of the readable information carrying elements, wherein at least two of the plurality of the readable information carrying elements are located in different quadrants.

3. The panel according to claim 2, wherein the panel comprises at least four of the plurality of the readable information carrying elements, wherein each quadrant is provided with at least one of the readable information carrying element.

4. The panel according to claim 2, wherein each quadrant defines four sub quadrants by two auxiliary principal axes, wherein one corner sub quadrant of each quadrant is situated at a distance from the main principal axes, wherein each corner quadrant is provided with at least one of the plurality of the readable information carrying elements.

5. The panel according to claim 1, wherein at the least one readable information carrying element is printed, either directly or indirectly, to the core and/or onto a backing layer affixed to the lower side of the core.

6. The panel according to claim 1, wherein the at least one readable information carrying element is at least partially embedded into the core and/or pressed and/or engraved into the core.

7. The panel according to claim 1, wherein the at least one readable information carrying element comprises visible information, wherein the visual information comprises textual information and/or graphical information, and wherein the graphical information is comprises installation instructions.

8. The panel according to claim 1, wherein the at least one readable information carrying element comprises haptic information, wherein the haptic information comprises embossed and/or debossed information.

9. The panel according to claim 1, wherein the at least one readable information carrying element is a machine-readable information carrying element configured to be read by a machine, wherein the machine is a camera, a scanner, and/or digital reader.

10. The panel according to claim 1, wherein the at least one readable information carrying element comprises a representation of a digital link, wherein the digital link comprises a weblink and/or a hyperlink, directing to at least one digital location where information relating to at least one panel related characteristic is stored and/or retrievable, and further wherein the information relating to the at least one panel related characteristic stored at the digital location and/or retrievable via the digital location comprises static information, wherein the static information comprises a text or an image; and/or comprises dynamic information, wherein the dynamic information is a video or auditory information.

11. The panel according to claim 1, wherein the at least one readable information carrying element represents a machine-readable code, wherein the machine-readable code is a linear bar code and/or a matrix barcode, wherein the matrix barcode is a QR code.

12. The panel according to claim 1, wherein the at least one readable information carrying element represents a machine-readable passive tag, wherein the machine-readable passive tag is an RFID tag or an NFC tag.

13. The panel according to claim 1, wherein the panel comprises at least two printed readable information carrying elements.

14. The panel according to claim 1, wherein the at least one readable information carrying element is a stamped and/or hot pressed information carrying element.

15. The panel according to claim 1, wherein the panel comprises a first panel edge comprising a first coupling profile, and a second panel edge comprising a second coupling profile being designed to engage interlockingly with said first coupling profile of an adjacent panel, both in horizontal direction and in vertical direction.

16. The panel according to claim 1, wherein the readable information carrying element is configured to provide information relating to at least one panel related characteristic chosen from a group consisting of: installation of the panel to compose a panel covering; dimensioning of the panel; material composition of at least one panel layer; origin of at least one material used in at least one panel layer; recycling related information of the panel; authenticity of the panel; circularity of the panel, type of coupling profiles used at at least two panel edges; certifications and declarations relating to the panel; and/or other documentation relating to the panel.

17. A decorative covering composed of a plurality of decorative panels according to claim 1, and further wherein the covering comprises sawn panel parts and/or cut panel parts, wherein each panel part is provided with the at least one readable information carrying element, wherein the at least one readable information carrying element is printed onto a rear side of the panel part.

18. A decorative panel system, comprising:
at least one decorative panel according to claim 1, wherein said panel comprises: a core having a lower side and an upper side, a decorative top structure affixed, either directly or indirectly, to the upper side of the core, and at least one machine-readable information carrying element carrying and/or provided with information relating to at least one panel related characteristic, wherein said machine-readable information carrying element comprises a representation, wherein the representation is a barcode or a QR code, of a digital link, wherein the digital link is a weblink and/or a hyperlink, directing to at least one digital location where information relating to at least one panel related characteristic, and wherein the at least one panel related characteristic is a digital panel passport, is stored and/or retrievable,
at least one digital scanner for reading said digital link and for referring an user to said digital location for displaying information relating to at least one panel related characteristic on a screen, wherein the screen is a user screen,
at least one digital location where said information is stored and retrievable,
wherein said digital scanner is configured to communicate wirelessly with said server by making use of Internet.

19. The system according to claim 18, wherein the digital scanner and the screen are integrated in a single device wherein the single device is a user device, and wherein the single device is a smartphone or tablet.

20. The system according to claim 18, wherein at least a part of at least one readable information carrying element represents an augmented reality triggering element for displaying said information as augmented reality layer over a live image of at least a part of said decorative panel.

* * * * *

UNITED STATES PATENT AND TRADEMARK OFFICE
CERTIFICATE OF CORRECTION

Page 1 of 1

PATENT NO.        : 12,366,072 B2
APPLICATION NO.   : 17/981232
DATED             : July 22, 2025
INVENTOR(S)       : Eddy Alberic Boucké

It is certified that error appears in the above-identified patent and that said Letters Patent is hereby corrected as shown below:

In the Claims

Column 28, Line 64, Claim 5, delete "at the least" and insert -- the at least --

Column 30, Line 47, Claim 19, delete "device" and insert -- device, --

Signed and Sealed this
Sixteenth Day of September, 2025

Coke Morgan Stewart
*Acting Director of the United States Patent and Trademark Office*